(12) United States Patent
Sasamoto

(10) Patent No.: US 8,098,441 B2
(45) Date of Patent: Jan. 17, 2012

(54) OBJECTIVE LENS FOR ENDOSCOPES

(75) Inventor: Tsutomu Sasamoto, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 61 days.

(21) Appl. No.: 12/317,215

(22) Filed: Dec. 18, 2008

(65) Prior Publication Data

US 2009/0161234 A1   Jun. 25, 2009

(30) Foreign Application Priority Data

Dec. 21, 2007   (JP) .................................. 2007-330440

(51) Int. Cl.
*G02B 21/02* (2006.01)
*G02B 9/34* (2006.01)
(52) U.S. Cl. ........................ 359/656; 359/781
(58) Field of Classification Search .......... 359/656–661, 359/771, 781–783
See application file for complete search history.

(56) References Cited

U.S. PATENT DOCUMENTS

| | | | | |
|---|---|---|---|---|
| 5,777,797 A * | 7/1998 | Miyano | ...... | 359/660 |
| 6,327,101 B1 * | 12/2001 | Miyano | ...... | 359/691 |
| 2004/0125469 A1 * | 7/2004 | Miyano | ...... | 359/783 |
| 2004/0240081 A1 * | 12/2004 | Saito | ...... | 359/754 |
| 2008/0055741 A1 * | 3/2008 | Asami | ...... | 359/738 |
| 2009/0052061 A1 * | 2/2009 | Asami | ...... | 359/783 |
| 2009/0290236 A1 * | 11/2009 | Wang et al. | ...... | 359/723 |

FOREIGN PATENT DOCUMENTS

JP    02-188709    7/1990
JP    08-334688    12/1996

* cited by examiner

*Primary Examiner* — Jordan Schwartz
(74) *Attorney, Agent, or Firm* — Kenyon & Kenyon LLP

(57) ABSTRACT

An objective lens for endoscopes has a front lens unit and a rear lens unit with an aperture stop between them. The front lens unit includes a first lens element with negative refracting power and a second lens element with positive refracting power, and the rear lens unit includes a third lens element with positive refracting power, a cemented lens component of a fourth lens element with positive refracting power and a fifth lens element with negative refracting power. The objective lens satisfies the following conditions:

$-2 < SF < -0.9$ $0.94 < D/(f \times \sin \theta) < 1.7$ $0.86 < (D_1 + D_2 - f_1)/(2 \times f_3) < 1.13$ where SF is the shape factor of the first lens element; D is a distance from the vertex of the image-side surface of the first lens element to the aperture stop; f is the combined focal length of the entire system; θ is a half angle of view; $D_1$ is an actually measured distance from the vertex of the object-side surface of the first lens element to the aperture stop; $D_2$ is a distance from the aperture stop to a vertex of the image-side surface of the third lens element; $f_1$ is the focal length of the first lens element; and $f_3$ is the focal length of the third lens element.

8 Claims, 36 Drawing Sheets

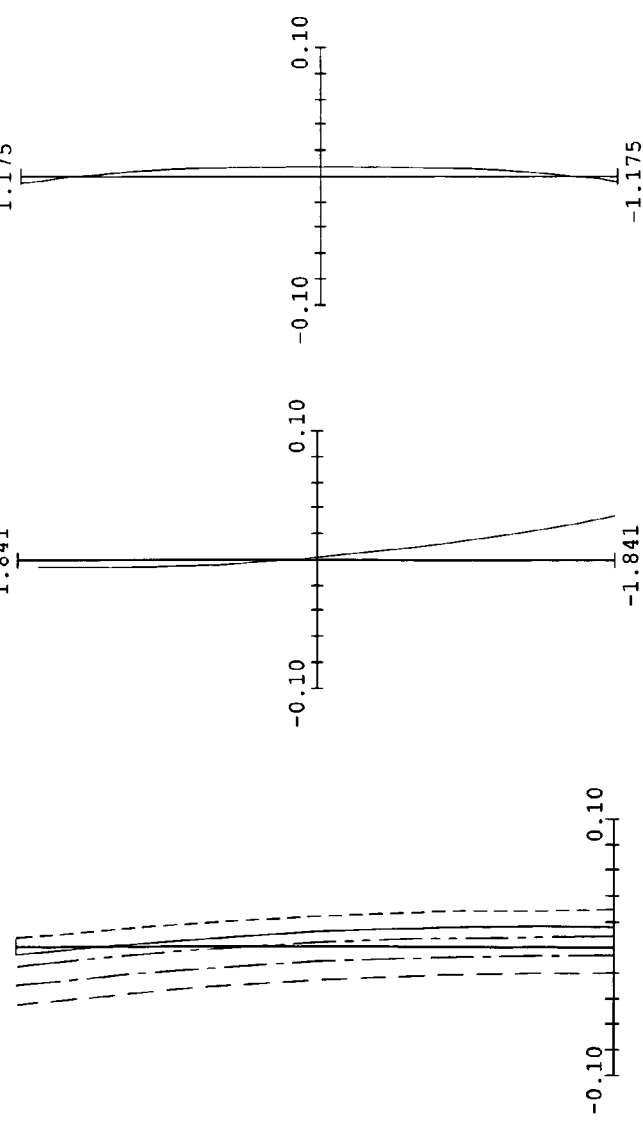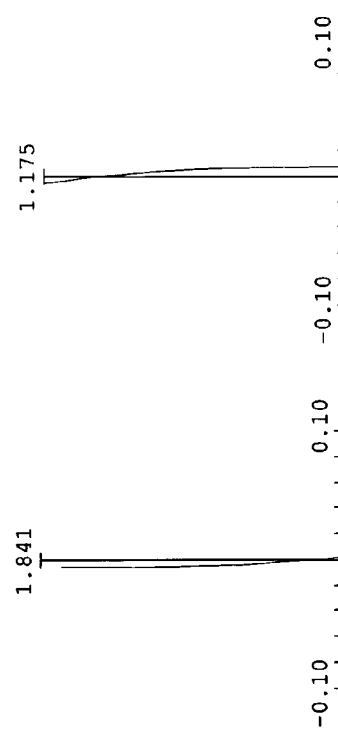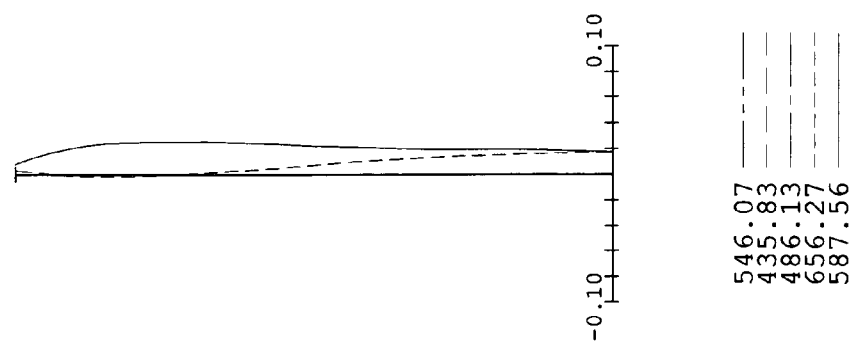

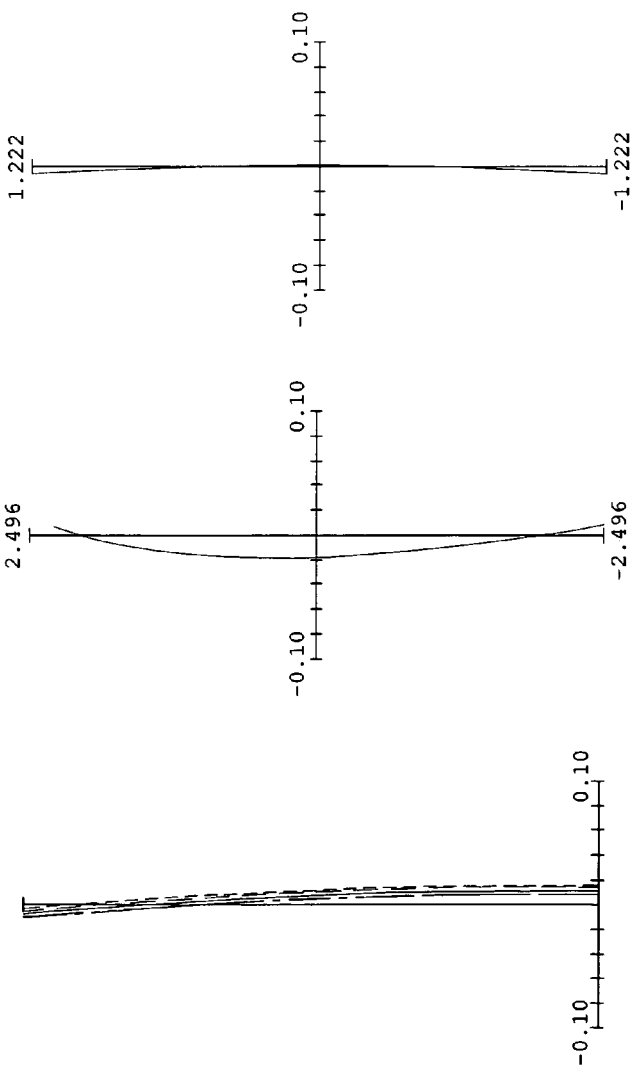
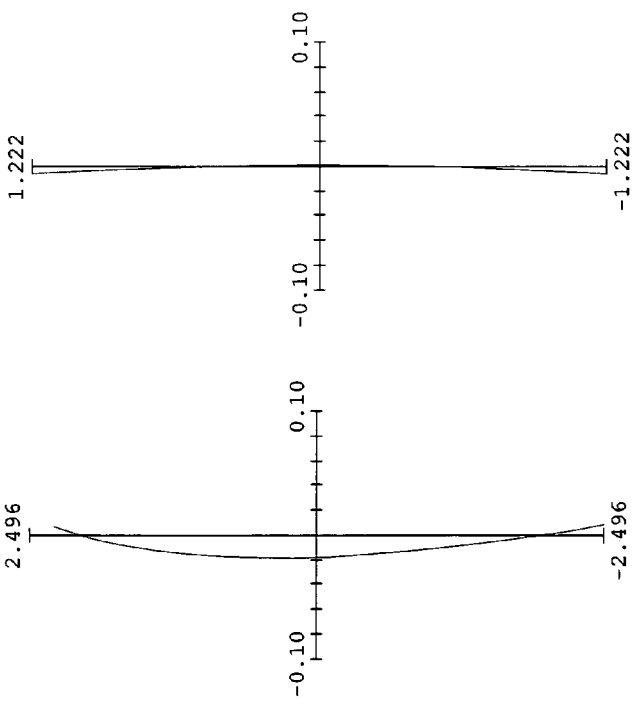
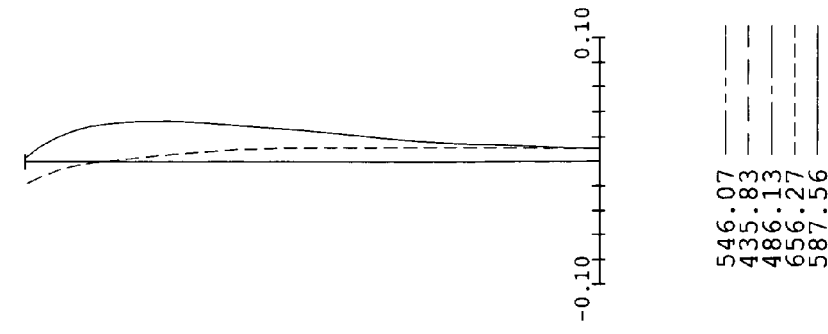

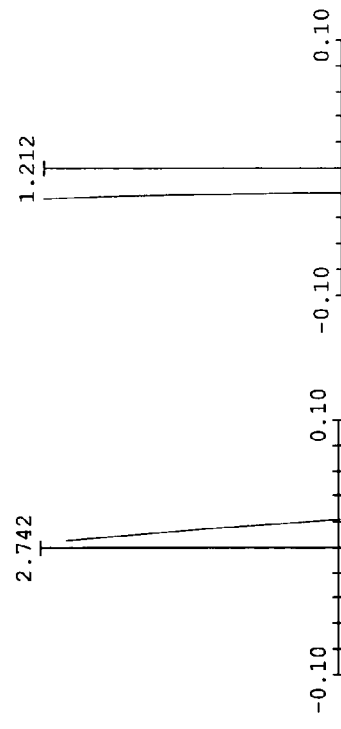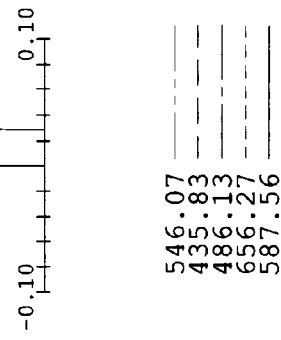
FIG.36A SPHERICAL ABERRATION FNO 7.898
FIG.36B COMA (M)
FIG.36C COMA (S)
FIG.36D CURVATURE OF FIELD FIY 1.20
546.07
435.83
486.13
656.27
587.56

OBJECTIVE LENS FOR ENDOSCOPES

This application claims benefits of Japanese Patent Application No. 2007-330440 filed in Japan on Dec. 21, 2007, the contents of which are incorporated herein by reference.

BACKGROUND OF THE INVENTION

1. Field of the Invention

This invention relates to an objective lens used in an endoscope.

2. Description of Related Art

Endoscopes have been used for observations of parts in which it is difficult to make external observations, like treatments and/or diagnoses of interiors of bodies of patients in a conventional field of medicine. Recently, a sleek design of the endoscope, represented by a nasal endoscope, has been needed and even for the objective lens used in the endoscope, downsizing of its outside diameter has been desired.

Since a conventional objective lens used in the endoscope has a very large angle of view, a retrofocus-type lens system in which a plano-concave lens element is generally used at the most object-side position of the objective lens has often been adopted. In the retrofocus-type lens system of this sort, the technique of designing a small objective lens is to impart a strong negative power to the plano-concave lens located at the most object-side position. However, when the first surface is configured to be flat, there is the problem that variation of the angle of view is increased. Additionally, in the retrofocus-type lens system, when the power of a front negative lens unit is increased to maintain the specification, the power of a rear positive lens unit must be necessarily increased.

However, conventional objective lenses for endoscopes in which the first surface is configured as a curved surface are disclosed, for example, in Japanese Patent Kokai Nos. Hei 08-334688 and Hei 02-188709.

The objective lens for endoscopes set forth in Kokai No. Hei 08-334688 includes, in order from the object side, a first lens element with negative refracting power of a meniscus shape; a second lens element of a plano-convex shape; a stop; a third lens element of a plano-convex shape; and a fourth lens element of a biconvex shape, and is designed to satisfy preset conditions described below and to configure the first surface as a convex surface.

$$Bf' > 1.5f' \quad (51)$$

$$1.80 < D/r_2 < 2.40 \quad (52)$$

$$v_2 < 45.0 \quad (53)$$

$$v_3 > 50.0 \quad (54)$$

$$v_4 > 50.0 \quad (55)$$

where Bf' is a back focus, f' is the focal length of the entire optical system, $r_2$ is the radius of curvature of the image-side surface of the first lens element, and D is the value of $d_2+(d_3/n_2)+d_4$, where $d_2$ is air spacing between the first lens element and the second lens element, $d_3$ is the center thickness of the second lens element, $d_4$ is air spacing between the second lens element and the stop, and $n_2$ is the refractive index of the second lens element.

The objective lens for endoscopes set forth in Kokai No. 02-188709 includes, in order from the object side, a first lens element with negative refracting power of a meniscus shape, with a concave surface facing the image side; a second lens element with positive refracting power of a meniscus shape, with a surface of the major radius of curvature facing the image side; an aperture stop; a third lens element of a biconvex shape with a surface of the major radius of curvature facing the object side; and a fourth cemented lens component with positive refracting power as a whole, and is designed to satisfy preset conditions described below and to configure the first surface as a convex surface.

$$0.6 < |f_1/f| < 0.70 \quad (61)$$

$$n_2 > 1.60 \; v_2 < 45.0 \quad (62)$$

$$n_3 > 1.60 \; v_3 > 50.0 \quad (63)$$

$$v_4 < 40.0 \quad (64)$$

$$n_5 > 1.60 \; v_5 > 50.0 \quad (65)$$

where $f_1$ is the focal length of the first lens element; f is the combined focal length of the entire system; $n_2$, $n_3$, and $n_5$ are refractive indices, relative to the d line, of glass materials used for convex lenses of the second lens element, the third lens element, and the fourth cemented lens component, respectively; and $v_2$, $v_3$, $v_4$, and $v_5$ are Abbe's numbers of glass materials used for the second lens element, the third lens element, the concave lens element of the fourth cemented lens component, and the convex lens element of the fourth cemented lens component, respectively.

SUMMARY OF THE INVENTION

The objective lens for endoscopes according to a first aspect of the present invention has a front lens unit and a rear lens unit with an aperture stop between them. The front lens unit comprises, in order from the object side, a first lens element with negative refracting power of a meniscus shape, with a convex surface facing the object side and a second lens element with positive refracting power, and the rear lens unit comprises a third lens element with positive refracting power, with a surface of the minor radius of curvature facing the image side; a fourth lens element with positive refracting power; and a fifth lens element with negative refracting power. In this case, the fourth lens element and the fifth lens element are cemented and the objective lens satisfies the following conditions:

$$-2 < SF < -0.9 \quad (1)$$

$$0.94 < D/(f \times \sin \theta) < 1.7 \quad (2)$$

$$0.86 < (D_1 + D_2 - f_1)/(2 \times f_3) < 1.13 \quad (3)$$

where SF is the shape factor of the first lens element and is a value expressed by SF=(R2+R1)/(R2−R1) when the radius of curvature of the object-side surface of the first lens element is denoted by R1 and the radius of curvature of the image-side surface is denoted by R2; D is a distance (an equivalent-air medium length) from the vertex of the image-side surface of the first lens element to the aperture stop; f is the combined focal length of the entire system; θ is a half angle of view; $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element. As used herein the "equivalent air medium length" or "equivalent air length" is the value equal to the actual length divided by a refractive index of a substance".

In the objective lens for endoscopes of the first aspect of the present invention, it is desirable to satisfy the following condition:

$$-1.5<SF<-1.0 \quad (1')$$

where SF is the shape factor of the first lens element and is a value expressed by SF=(R2+R1)/(R2−R1) when the radius of curvature of the object-side surface is denoted by R1 and the radius of curvature of the image-side surface is denoted by R2.

In the objective lens for endoscopes of the first aspect of the present invention, it is desirable to satisfy the following condition:

$$0.90<(D_1+D_2-f_1)/(2\times f_3)<1.06 \quad (3')$$

where $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element.

In the objective lens for endoscopes of the first aspect of the present invention, it is desirable that the third lens element is the lens element with positive refracting power, with a surface configured as an aspherical surface whose curvature moderates in going from the center to the periphery facing the image side.

The objective lens for endoscopes according to a second aspect of the present invention has a front lens unit and a rear lens unit with an aperture stop between them. The front lens unit comprises, in order from the object side, a first lens element with negative refracting power of a meniscus shape, with a convex surface facing the object side and a second lens element with positive refracting power, and the rear lens unit comprises a third lens element with positive refracting power, with a surface configured as an aspherical surface whose curvature moderates in going from the center to the periphery facing the image side; a fourth lens element with positive refracting power; and a fifth lens element with negative refracting power. In this case, the fourth lens element and the fifth lens element are cemented and the objective lens satisfies the following conditions:

$$-2<SF<-0.9 \quad (1)$$

$$0.65<D/(f\times\sin\theta)\leq 0.94 \quad (4)$$

$$0.86<(D_1+D_2-f_1)/(2\times f_3)<1.13 \quad (3)$$

where SF is the shape factor of the first lens element and is a value expressed by SF=(R2+R1)/(R2−R1) when the radius of curvature of the object-side surface of the first lens element is denoted by R1 and the radius of curvature of the image-side surface is denoted by R2; D is a distance (an equivalent-air medium length) from the vertex of the image-side surface of the first lens element to the aperture stop; f is the combined focal length of the entire system; θ is a half angle of view; $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element.

In the objective lens for endoscopes of the second aspect of the present invention, it is desirable to satisfy the following condition:

$$-1.5<SF<-1.0 \quad (1')$$

where SF is the shape factor of the first lens element and is a value expressed by SF=(R2+R1)/(R2−R1) when the radius of curvature of the object-side surface is denoted by R1 and the radius of curvature of the image-side surface is denoted by R2.

In the objective lens for endoscopes of the second aspect of the present invention, it is desirable to satisfy the following condition:

$$0.90<(D_1+D_2-f_1)/(2\times f_3)<1.06 \quad (3')$$

where $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element.

In the objective lens for endoscopes of the second aspect of the present invention, it is desirable to satisfy the following condition:

$$0.8<D/(f\times\sin\theta)\leq 0.94 \quad (4')$$

where D is a distance (an equivalent-air medium length) from the vertex of the image-side surface of the first lens element to the aperture stop; f is the combined focal length of the entire system; and θ is a half angle of view.

According to the present invention, the objective lens for endoscopes is obtained in which variation in the angle of view is kept to a minimum and at the same time, aberration can be completely corrected to obtain favorable image quality and the compact design can be attained. The objective lens for endoscopes is useful in the fields of medicine and industry in which it is needed that the endoscope is used to observe the hole of fine diameter such as a tubule in the body of the patient.

These and other features and advantages of the present invention will become apparent from the following detailed description of the preferred embodiments when taken in conjunction with the accompanying drawings.

BRIEF DESCRIPTION OF THE DRAWINGS

FIGS. 20A, 20B, 20C, and 20D are graphs showing spherical aberration, coma (meridional rays), coma (sagittal rays), and curvature of field, respectively, in the optical system of Embodiment 10.

FIGS. 24A, 24B, 24C, and 24D are graphs showing spherical aberration, coma (meridional rays), coma (sagittal rays), and curvature of field, respectively, in the optical system of Embodiment 12.

FIGS. 36A, 36B, 36C, and 36D are graphs showing spherical aberration, coma (meridional rays), coma (sagittal rays), and curvature of field, respectively, in the optical system of Embodiment 18.

DETAILED DESCRIPTION OF THE PREFERRED EMBODIMENTS

Figure 1:
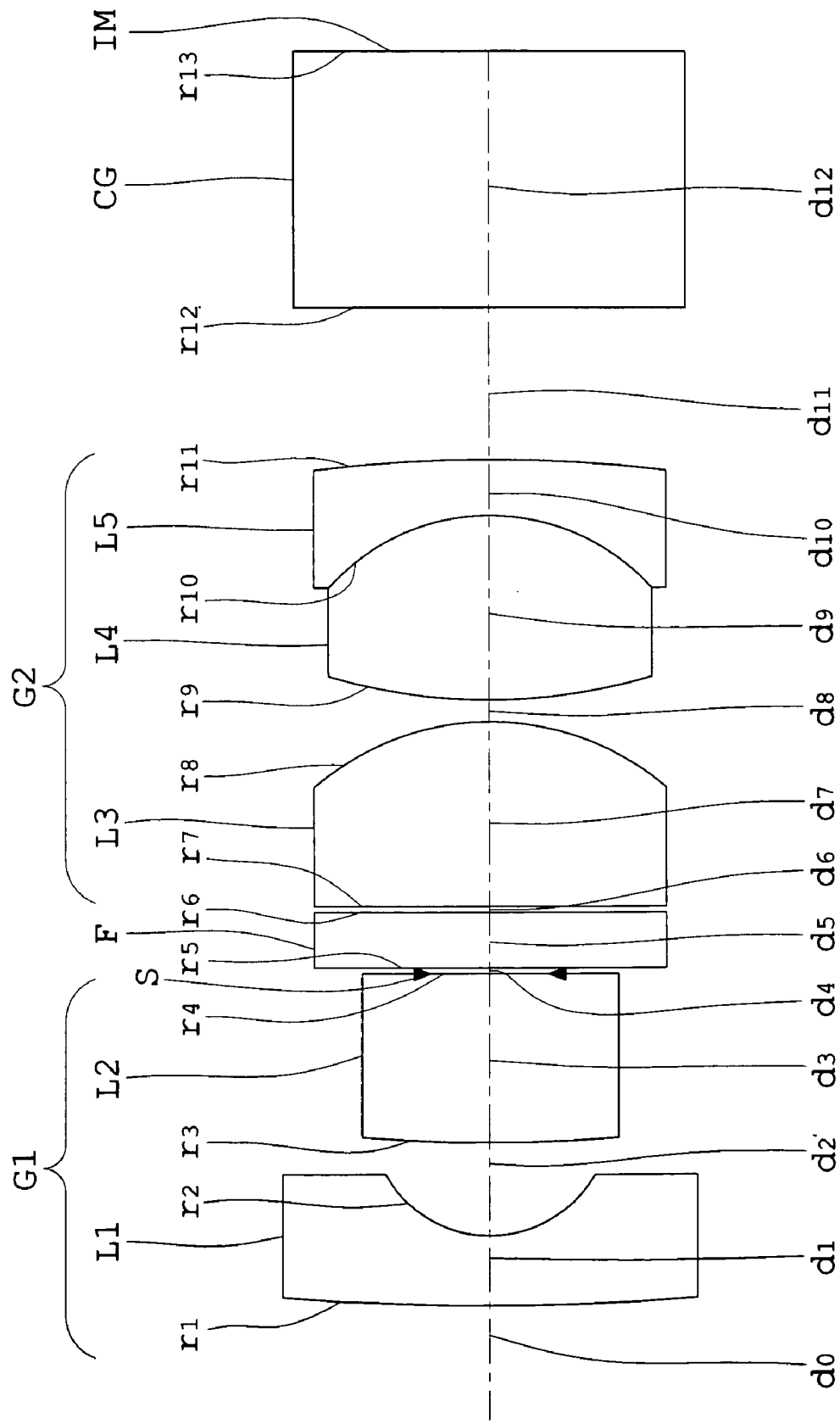
FIG. 1 is a sectional view showing an optical arrangement, developed along the optical axis, of the objective lens for endoscopes of Embodiment 1 according to the present invention.
Figure 2:
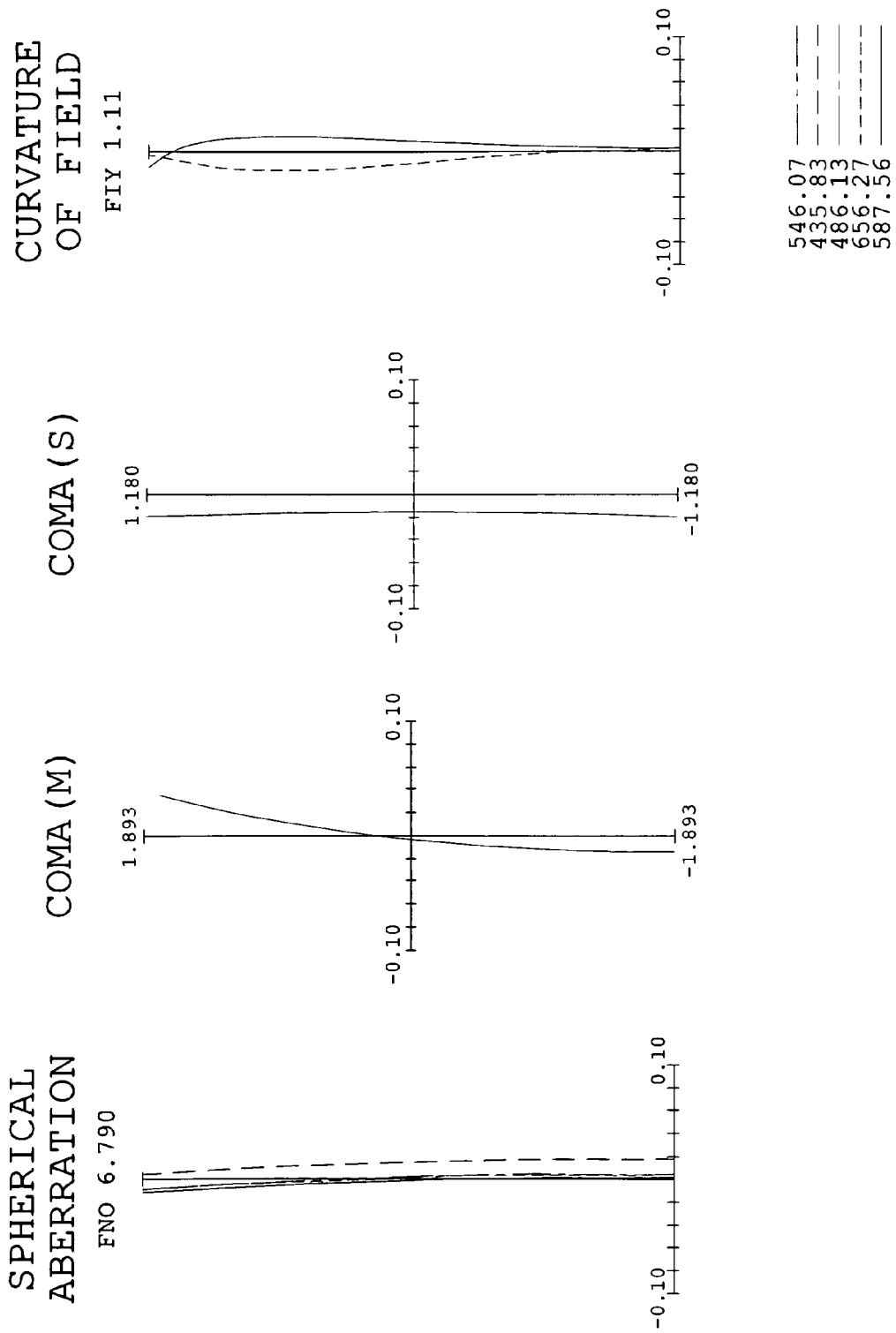
FIGS. 2A, 2B, 2C, and 2D are graphs showing spherical aberration, coma (meridional rays), coma (sagittal rays), and curvature of field, respectively, in the optical system of Embodiment 1.

Before undertaking the description of the embodiments, the function and effect of the present invention will be explained.

The objective lens for endoscopes according to the first aspect of the present invention has a front lens unit and a rear lens unit with an aperture stop between them. The front lens unit comprises, in order from the object side, a first lens element with negative refracting power of a meniscus shape, with a convex surface facing the object side and a second lens element with positive refracting power, and the rear lens unit comprises a third lens element with positive refracting power, with a surface of the minor radius of curvature facing the image side; a fourth lens element with positive refracting power; and a fifth lens element with negative refracting power. In this case, the fourth lens element and the fifth lens element are cemented. When the first lens element is configured into a meniscus shape having negative refracting power with a convex surface facing the object side, the first surface is configured not as a flat surface, but as a curved surface, and hence variation in the angle of view can be kept to a minimum and the depth of field can be increased.

Here, the objective lens for endoscopes of the first aspect of the present invention satisfies the following conditions:

$$-2 < SF < -0.9 \tag{1}$$

$$0.94 < D/(f \times \sin\theta) < 1.7 \tag{2}$$

$$0.86 < (D_1 + D_2 - f_1)/(2 \times f_3) < 1.13 \tag{3}$$

where SF is the shape factor of the first lens element and is a value expressed by SF=(R2+R1)/(R2−R1) when the radius of curvature of the object-side surface of the first lens element is denoted by R1 and the radius of curvature of the image-side surface is denoted by R2; D is a distance (an equivalent-air medium length) from the vertex of the image-side surface of the first lens element to the aperture stop; f is the combined focal length of the entire system; θ is a half angle of view; $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element.

Beyond the upper limit of Condition (1), the first surface is too approximate to a flat surface to obtain the merit that the first lens element is configured into a meniscus shape. On the other hand, below the lower limit of Condition (1), the negative power of the first lens element is lessened and the angle of view ceases to be widely ensured. Here, when the first lens element is spaced away from the aperture stop like the objective lens for endoscopes set forth in Kokai No. 08-334688, the angle of view can be widely ensured. However, this causes oversizing of the lens and is not suitable for the endoscope in which the sleek design has recently been required. In order to widely ensure the angle of view with the condition that the negative power of the first lens element is lessened, it is necessary to increase the power of the third lens element located in the rear lens unit and playing an important role in determining the focal length of the entire system. In this case, the power of the third lens element is extremely increased so that lens workability is fairly impaired and correction for aberration becomes difficult.

Also, the objective lens for endoscopes should preferably satisfy the following condition:

$$-1.5 < SF < -1.0 \tag{1'}$$

where SF is the shape factor of the first lens element and is a value expressed by SF=(R2+R1)/(R2−R1) when the radius of curvature of the object-side surface is denoted by R1 and the radius of curvature of the image-side surface is denoted by R2.

In the case where the value of Condition (2) is below the lower limit and attempts are made to prevent oversizing of the lens and to obtain the angle of view required for the endoscope under the condition that the power of the first lens element is lessened within the limit of Condition (1) or (1'), the power of the third lens element is necessarily increased and curvature of field and coma cease to be correctable. On the other hand, when the value of Condition (2) is beyond the upper limit and an attempt is made to obtain the angle of view required for the endoscope under the condition that the power of the first lens element is lessened, the first lens element becomes too large like the objective lens for endoscopes set forth in Kokai No. 08-334688 and is not used in the endoscope in which the sleek design has recently been required.

Below the lower limit of Condition (3) within the limit of Condition (1) or (1') and also within the limit of Condition (2), the curvature of the surface of the third lens element becomes strong. In this state, when an attempt is made to correct aberration in the front and rear lens units, curvature of field, spherical aberration, and coma cease to be correctable. On the other hand, beyond the upper limit of Condition (3), the curvature of the third lens element becomes too moderate so that the lens is oversized and curvature of field is overcorrected and becomes difficult to be corrected.

Also, the objective lens for endoscopes should preferably satisfy the following condition:

$$0.90 < (D_1 + D_2 - f_1)/(2 \times f_3) < 1.06 \tag{3'}$$

where $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element.

In the objective lens for endoscopes of the first aspect of the present invention, it is desirable that the third lens element is the lens element with positive refracting power, with a surface configured as an aspherical surface whose curvature moderates in going from the center to the periphery facing the image side. By doing so, the curvature of the cemented surface between the fourth lens element and the fifth lens element can be moderated and the lens workability is improved.

The objective lens for endoscopes according to the second aspect of the present invention has a front lens unit and a rear lens unit with an aperture stop between them. The front lens unit comprises, in order from the object side, a first lens element with negative refracting power of a meniscus shape, with a convex surface facing the object side and a second lens element with positive refracting power, and the rear lens unit comprises a third lens element with positive refracting power, with a surface configured as an aspherical surface whose curvature moderates in going from the center to the periphery facing the image side; a fourth lens element with positive refracting power; and a fifth lens element with negative refracting power. In this case, the fourth lens element and the fifth lens element are cemented. When the first lens element is configured into a meniscus shape having negative refracting power with a convex surface facing the object side, the first surface is not configured as a flat surface, and hence variation in the angle of view can be kept to a minimum and the depth of field can be increased.

Here, the objective lens for endoscopes of the second aspect of the present invention satisfies the following conditions:

$$-2 < SF < -0.9 \tag{1}$$

$$0.65 < D/(f \times \sin\theta) \leq 0.94 \tag{4}$$

$$0.86 < (D_1 + D_2 - f_1)/(2 \times f_3) < 1.13 \tag{3}$$

where SF is the shape factor of the first lens element and is a value expressed by SF=(R2+R1)/(R2−R1) when the radius of curvature of the object-side surface of the first lens element is denoted by R1 and the radius of curvature of the image-side surface is denoted by R2; D is a distance (an equivalent-air medium length) from the vertex of the image-side surface of the first lens element to the aperture stop; f is the combined focal length of the entire system; θ is a half angle of view; $D_1$ is an actually measured distance from the vertex of the object-side surface of the first lens element to the aperture stop; $D_2$ is a distance (an equivalent-air medium length) from the aperture stop to the image-side surface of the third lens element; $f_1$ is the focal length of the first lens element; and $f_3$ is the focal length of the third lens element.

Beyond the upper limit of Condition (1), the first surface is too approximate to a flat surface to obtain the merit that the first lens element is configured into a meniscus shape. On the other hand, below the lower limit of Condition (1), the negative power of the first lens element is lessened and the angle of view ceases to be widely ensured. Here, when the first lens element is spaced away from the aperture stop like the objective lens for endoscopes set forth in Kokai No. 08-334688, the angle of view can be widely ensured. However, this causes oversizing of the lens as mentioned above and is not suitable for the endoscope in which the sleek design has recently been required. In order to widely ensure the angle of view with the condition that the negative power of the first lens element is lessened, it is necessary to increase the power of the third lens element located in the rear lens unit and playing an important role in determining the focal length of the entire system. In this case, the power of the third lens element is extremely increased so that lens workability is fairly impaired and correction for aberration becomes difficult.

Also, the objective lens for endoscopes should preferably satisfy the following condition:

$$-1.5 < SF < -1.0 \quad (1')$$

where SF is the shape factor of the first lens element and is a value expressed by SF=(R2+R1)/(R2−R1) when the radius of curvature of the object-side surface is denoted by R1 and the radius of curvature of the image-side surface is denoted by R2.

In the case where the value of Condition (4) is below the lower limit and attempts are made to prevent oversizing of the lens and to obtain the angle of view required for the endoscope under the condition that the power of the first lens element is lessened within the limit of Condition (1) or (1'), the power of the third lens element is necessarily highly increased, the workability is impaired with a spherical lens element alone, and curvature of field ceases to be correctable. Consequently, an aspherical lens element is required, but even though the surface of the third lens element is configured as the aspherical surface, correction for aberration becomes difficult. On the other hand, when the value of Condition (4) is beyond the upper limit and an attempt is made to obtain the angle of view required for the endoscope under the condition that the power of the first lens element is lessened, somewhat high power is likewise required for the third lens element. However, when Condition (2) is satisfied, like the first aspect of the present invention, corrections for curvature of field and coma become possible even though the aspherical lens element is not necessarily required.

Also, the objective lens for endoscopes should preferably satisfy the following condition:

$$0.8 < D/(f \times \sin \theta) \leq 0.94 \quad (4')$$

where D is a distance (an equivalent-air medium length) from the vertex of the image-side surface of the first lens element to the aperture stop; f is the combined focal length of the entire system; and θ is a half angle of view.

In accordance with the drawings, the embodiments of the present invention will be explained below.

Embodiment 1

FIG. 1 is a sectional view showing an optical arrangement, developed along the optical axis, of the objective lens for endoscopes of Embodiment 1 according to the present invention. FIGS. 2A, 2B, 2C, and 2D are graphs showing spherical aberration, coma (meridional rays), coma (sagittal rays), and curvature of field, respectively, in the optical system of Embodiment 1.

The objective lens for endoscopes of Embodiment 1 has a front lens unit G1 and a rear lens unit G2 with an aperture stop S and a filter F between them. In FIG. 1, reference symbol CG denotes a cover glass and IM denotes an image plane. Here, the filter F is an infrared cutoff filter. In the objective lens for endoscopes of Embodiment 1, a part of a third lens element L3 whose center thickness is relatively large is replaced with the infrared cutoff filter and the replaced infrared cutoff filter is introduced into an objective optical system in such a way that it is interposed between the third lens element L3 and the aperture stop S. In the infrared cutoff filter, a YAG laser cutoff coat is applied to its one surface because of laser therapy used in endoscope treatment. The YAG laser cutoff coat may be added to the other surface, or an LD laser cutoff coat or another functional coat may be applied. In addition, the functional coats may be applied to both surfaces or an antireflection coat, such as a multicoat, may be simply used. In the objective lens for endoscopes of Embodiment 1 shown in FIG. 1, as mentioned above, the infrared cutoff filter is introduced, but another functional filter may be introduced. For example, instead of the infrared cutoff filter, a color filter may be introduced to bring about a change to the color reproducibility of an endoscopic image. Moreover, in the objective lens for endoscopes of Embodiment 1 shown in FIG. 1, a part of the third lens element L3 whose center thickness is large is replaced with the single infrared filter, which is inserted between the third lens element L3 and the aperture stop S. However, two or three infrared cutoff filters, or a plurality of infrared cutoff filters may be inserted between the third lens element L3 and the aperture stop S within the tolerance of the workability of the third lens element L3. Alternatively, two or three filters, or a plurality of filters to which different functions are imparted may be inserted. For example, the infrared cutoff filter and a notch filter may be inserted together, or, for example, even when a single infrared cutoff filter, a single color filter, and a single notch filter are inserted together, there is no problem. Any filter designed as the functional filer can, of course, be used for replacement.

In the objective lens for endoscopes of Embodiment 1 shown in FIG. 1, a part of the third lens element L3 whose center thickness is large is replaced with the filter, but a part of a second lens element L2 whose center thickness is large may be replaced with the filter so that it is inserted between the second lens element L2 and the aperture stop S, or a few filters may be introduced into the objective lens within the tolerance of the workability. If the filter can be inserted between the front lens unit G1 and the rear lens unit G2 or placed before or behind them without replacing a part of the lens element whose center thickness is large with the filter by force, the filter may be located at any position in this range. The arrangement and construction of the filters mentioned above hold for any embodiment of the present invention.

The front lens unit G1 comprises, in order from the object side, a first lens element is L1 with negative refracting power of a meniscus shape, with a convex surface facing the object side and a second lens element L2 of a plano-convex shape whose object-side surface is convex and whose image-side surface is flat. The rear lens unit G2 comprises a third lens element L3 of a plano-convex shape whose object-side surface is flat and whose image-side surface is convex, with a surface of the minor radius of curvature facing the image side; a fourth lens element L4 of a biconvex shape; and a fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 1 are shown below. Also, in the lens sectional view shown in FIG. 1, numerals indicated as subscripts of $r_1, r_2, \ldots$ and $d_1, d_2, \ldots$ correspond to face numbers 1, 2, ... in the numerical data described below. In the numerical data, the refractive index and Abbe's number are values at the e line. These also hold for cases of other embodiments.

Numerical Embodiment 1
Unit: mm

Surface data

| Face number | Radius of curvature | Face spacing | Refractive index | Abbe's number |
|---|---|---|---|---|
| Object surface | ∞ | 8.0000 | | |
| 1 | 16.1898 | 0.4642 | 1.88815 | 40.76 |
| 2 | 0.8149 | 0.6108 | | |
| 3 | 8.5567 | 1.1240 | 1.81078 | 40.88 |
| 4 (Stop) | ∞ | 0.0421 | | |
| 5 | ∞ | 0.3665 | 1.51965 | 75.00 |
| 6 | ∞ | 0.0313 | | |
| 7 | ∞ | 1.2339 | 1.81078 | 40.88 |
| 8 | −1.7861 | 0.1344 | | |
| 9 | 3.3987 | 1.2217 | 1.72341 | 50.23 |
| 10 | −1.4184 | 0.3665 | 1.93429 | 18.90 |
| 11 | −9.6782 | 1.0079 | | |
| 12 | ∞ | 1.6700 | 1.51825 | 64.14 |
| 13 | ∞ | 0 | | |
| 14 (Image plane) | ∞ | 0 | | |

Various data

| | |
|---|---|
| Focal length | 0.99997 |
| F number | 6.7904 |
| Angle of view | 161.474° |
| Image height | 1.114 |
| Overall lens length | 8.2733 |
| Back focus | 2.1096 |

Embodiment 2

Figure 3:
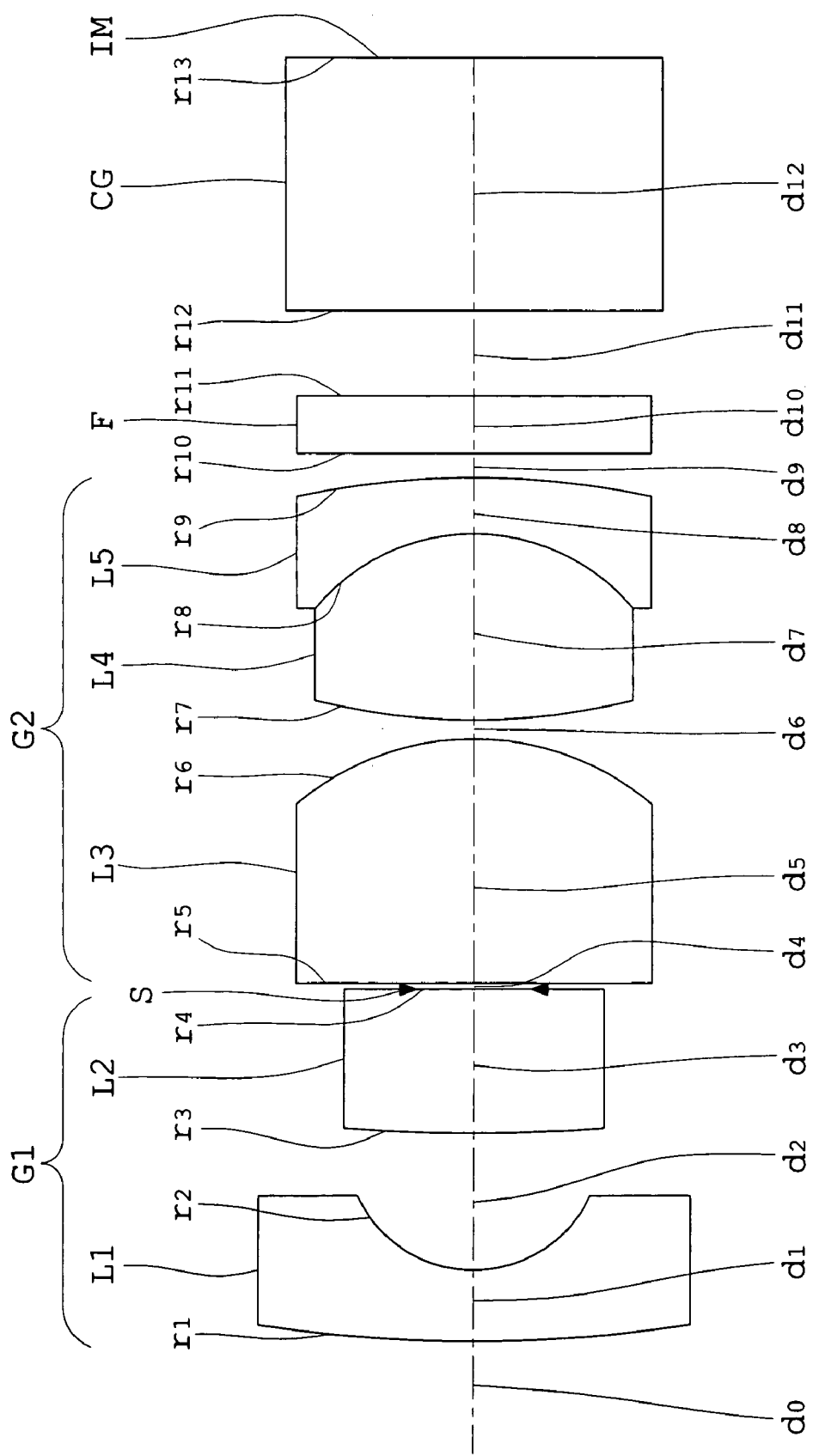
FIG. 3 is a sectional view showing an optical arrangement, developed along the optical axis, of the objective lens for endoscopes of Embodiment 2 according to the present invention.
Figure 4:
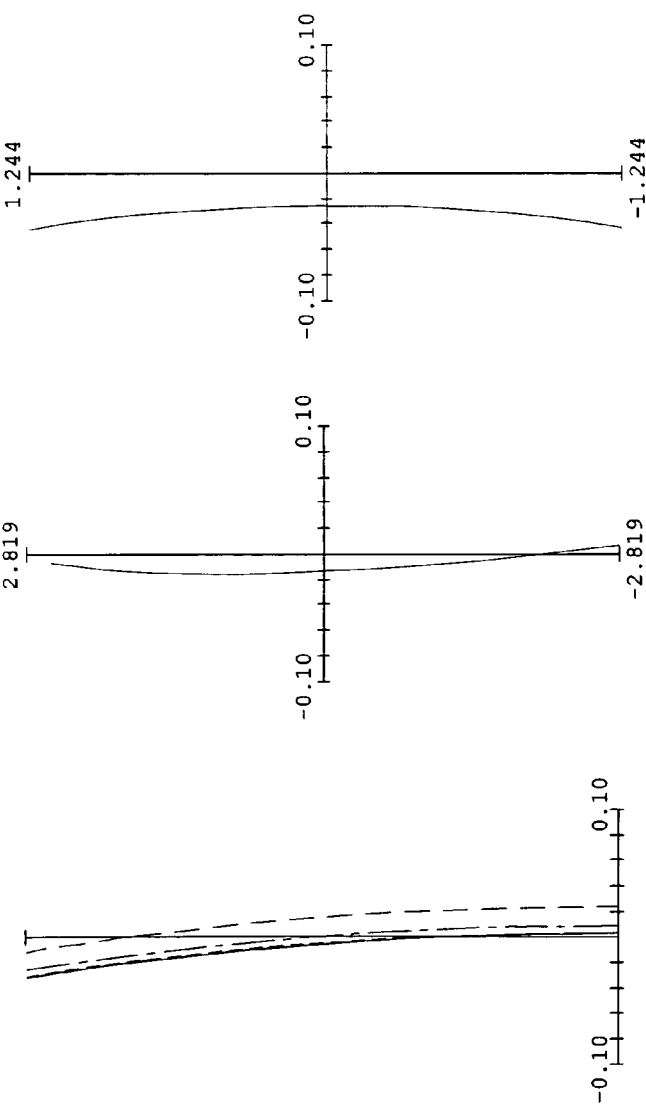
FIGS. 4A, 4B, 4C, and 4D are graphs showing spherical aberration, coma (meridional rays), coma (sagittal rays), and curvature of field, respectively, in the optical system of Embodiment 2.

FIG. 3 is a sectional view showing an optical arrangement, developed along the optical axis, of the objective lens for endoscopes of Embodiment 2 according to the present invention. FIGS. 4A, 4B, 4C, and 4D are graphs showing spherical aberration, coma (meridional rays), coma (sagittal rays), and curvature of field, respectively, in the optical system of Embodiment 2.

The objective lens for endoscopes of Embodiment 2 has the front lens unit G1 and the rear lens unit G2 with the aperture stop S between them. In FIG. 3, reference symbol F denotes the filter, CG denotes the cover glass, and IM denotes the image plane. A fundamental arrangement of lens elements in each of the front lens unit G1 and the rear lens unit G2 is almost the same as in Embodiment 1. Also, Embodiment 2 is such that the infrared cutoff filter F is placed behind the rear lens unit G2. As described in Embodiment 1, the filter may be located at any position between the front lens unit G1 and the rear lens unit G2 and before or behind them. In addition, the filter F may be cemented to the cover glass CG or two or three filters may be arranged in layers.

Subsequently, numerical data of optical members constituting the objective lens for endoscopes of Embodiment 2 are shown below.

Numerical Embodiment 2
Unit: mm

Surface data

| Face number | Radius of curvature | Face spacing | Refractive index | Abbe's number |
|---|---|---|---|---|
| Object surface | ∞ | 8.0115 | | |
| 1 | 8.2528 | 0.4798 | 1.88815 | 40.76 |
| 2 | 0.8636 | 0.9430 | | |
| 3 | 11.6095 | 0.9842 | 1.81078 | 40.88 |
| 4 (Stop) | ∞ | 0.0343 | | |
| 5 | ∞ | 1.6667 | 1.81078 | 40.88 |
| 6 | −1.8605 | 0.1230 | | |
| 7 | 4.3282 | 1.2672 | 1.73234 | 54.68 |
| 8 | −1.4322 | 0.3814 | 1.93429 | 18.90 |
| 9 | −6.5205 | 0.1722 | | |
| 10 | ∞ | 0.3814 | 1.51965 | 75.00 |
| 11 | ∞ | 0.5905 | | |
| 12 | ∞ | 1.6874 | 1.51825 | 64.14 |
| 13 | ∞ | 0 | | |
| 14 (Image plane) | ∞ | 0 | | |

Various data

| | |
|---|---|
| Focal length | 1.00000 |
| F number | 4.8768 |
| Angle of view | 162.119° |
| Image height | 1.180 |
| Overall lens length | 8.7114 |
| Back focus | 1.7056 |

Embodiment 3

Figure 5:
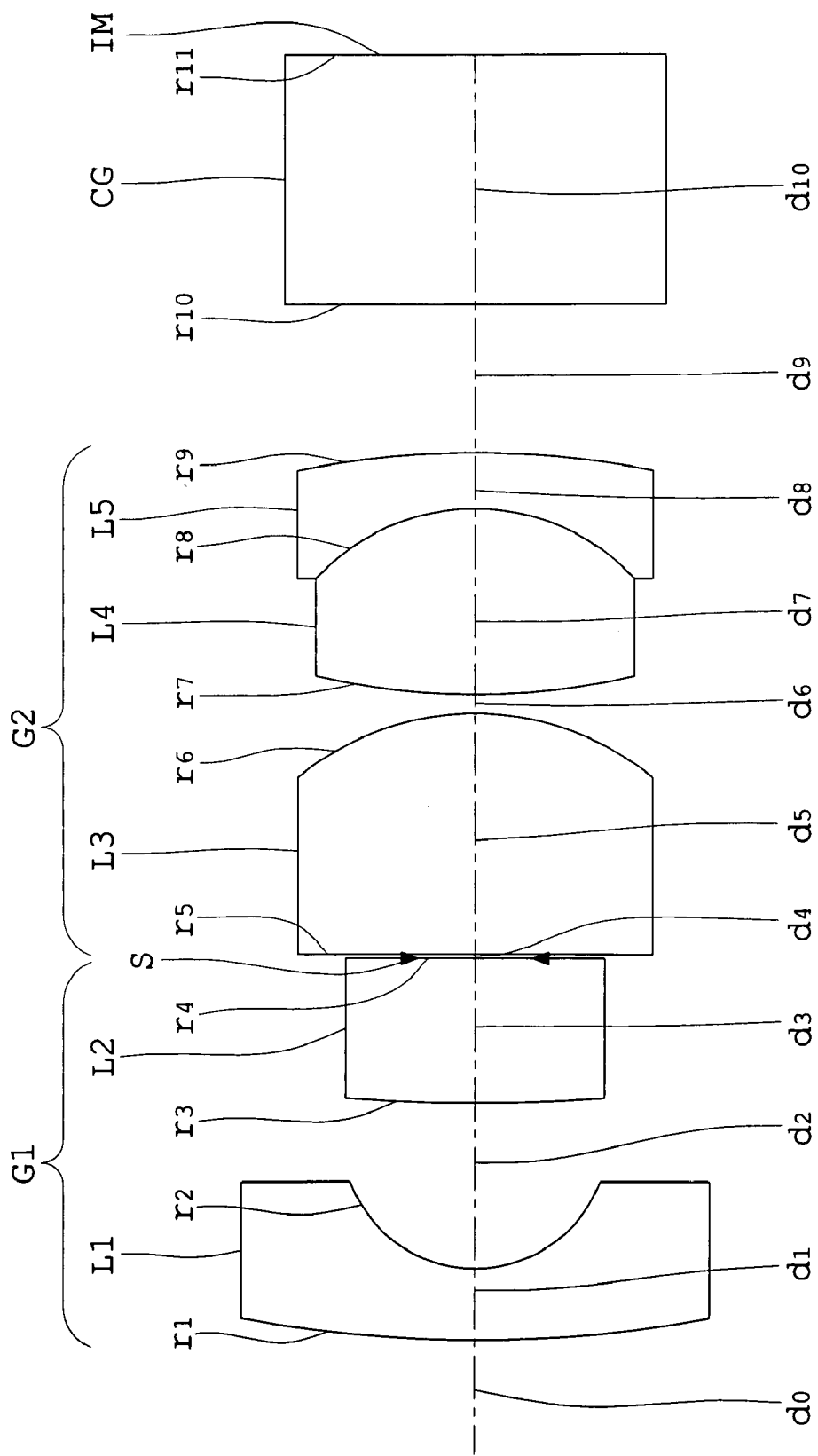
FIG. 5 is a sectional view showing an optical arrangement, developed along the optical axis, of the objective lens for endoscopes of Embodiment 3 according to the present invention.
Figure 6:
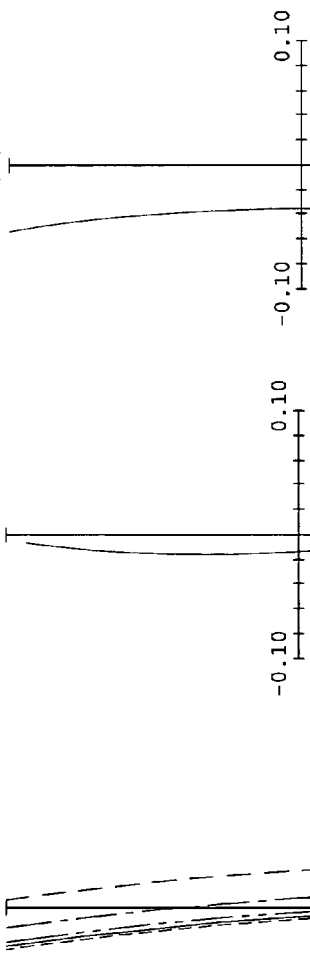
FIGS. 6A, 6B, 6C, and 6D are graphs showing spherical aberration, coma (meridional rays), coma (sagittal rays), and curvature of field, respectively, in the optical system of Embodiment 3.

FIG. 5 is a sectional view showing an optical arrangement, developed along the optical axis, of the objective lens for endoscopes of Embodiment 3 according to the present invention. FIGS. 6A, 6B, 6C, and 6D are graphs showing spherical aberration, coma (meridional rays), coma (sagittal rays), and curvature of field, respectively, in the optical system of Embodiment 3.

The objective lens for endoscopes of Embodiment 3 has the front lens unit G1 and the rear lens unit G2 with the aperture stop S between them. In FIG. 5, reference symbol CG denotes the cover glass and IM denotes the image plane.

A fundamental arrangement of lens elements in each of the front lens unit G1 and the rear lens unit G2 is almost the same as in Embodiment 1.

Subsequently, numerical data of optical members constituting the objective lens for endoscopes of Embodiment 3 are shown below.

Numerical Embodiment 3
Unit: mm

Surface data

| Face number | Radius of curvature | Face spacing | Refractive index | Abbe's number |
|---|---|---|---|---|
| Object surface | ∞ | 8.0000 | | |
| 1 | 8.2457 | 0.4794 | 1.88815 | 40.76 |
| 2 | 0.9159 | 1.1266 | | |
| 3 | 10.1774 | 0.9834 | 1.81078 | 40.88 |
| 4 (Stop) | ∞ | 0.0344 | | |
| 5 | ∞ | 1.6414 | 1.77621 | 49.60 |
| 6 | −1.9307 | 0.1229 | | |
| 7 | 4.2535 | 1.2661 | 1.73234 | 54.68 |
| 8 | −1.4731 | 0.3811 | 1.93429 | 18.90 |
| 9 | −6.2573 | 1.0100 | | |
| 10 | ∞ | 1.6900 | 1.51825 | 64.14 |
| 11 | ∞ | 0 | | |
| 12 (Image plane) | ∞ | 0 | | |

Various data

| | |
|---|---|
| Focal length | 1.00000 |
| F number | 4.7924 |
| Angle of view | 161.70366° |
| Image height | 1.179 |
| Overall lens length | 8.7353 |
| Back focus | 2.1271 |

Embodiment 4

Reference Example

Figure 7:
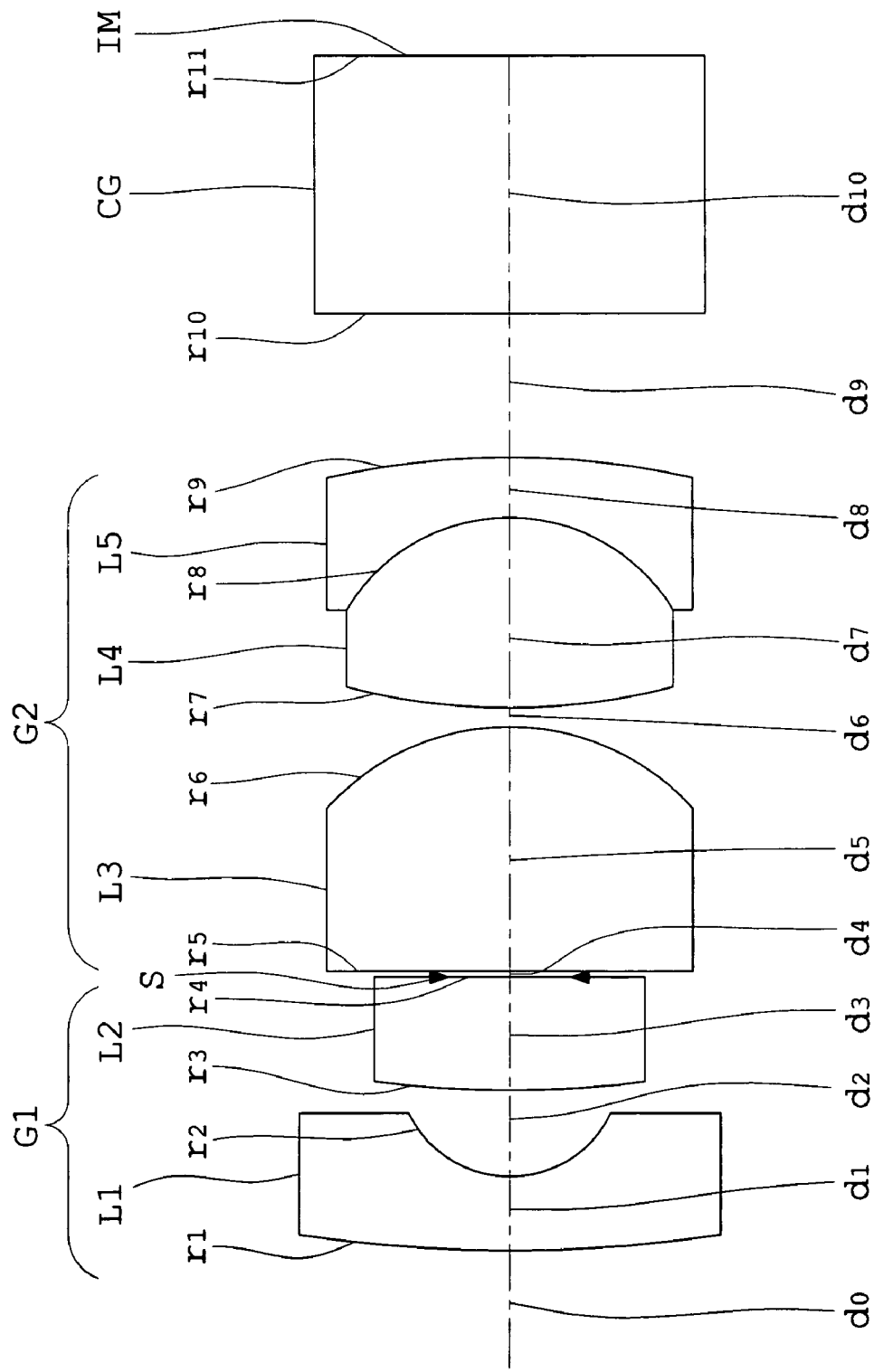
FIG. 7 is a sectional view showing an optical arrangement, developed along the optical axis, of the objective lens for endoscopes of Embodiment 4 according to the present invention.
Figure 8:
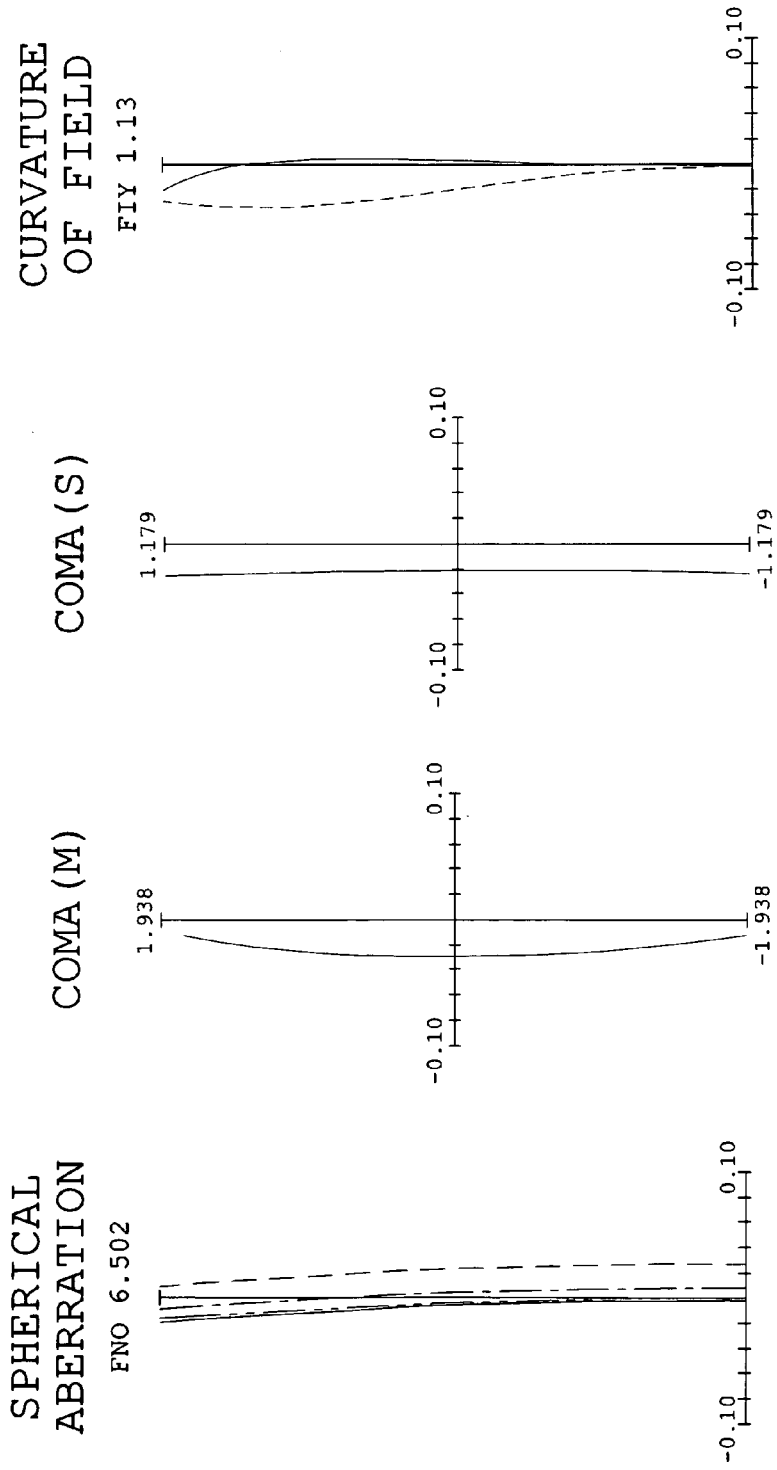
FIGS. 8A, 8B, 8C, and 8D are graphs showing spherical aberration, coma (meridional rays), coma (sagittal rays), and curvature of field, respectively, in the optical system of Embodiment 4.

FIG. 7 is a sectional view showing an optical arrangement, developed along the optical axis, of the objective lens for endoscopes of Embodiment 4 (Reference Example) according to the present invention. FIGS. 8A, 8B, 8C, and 8D are graphs showing spherical aberration, coma (meridional rays), coma (sagittal rays), and curvature of field, respectively, in the optical system of Embodiment 4 (Reference Example).

The objective lens for endoscopes of Embodiment 4 (Reference Example) has the front lens unit G1 and the rear lens unit G2 with the aperture stop S between them. In FIG. 7, reference symbol CG denotes the cover glass and IM denotes the image plane.

A fundamental arrangement of lens elements in each of the front lens unit G1 and the rear lens unit G2 is almost the same as in Embodiment 1.

Subsequently, numerical data of optical members constituting the objective lens for endoscopes of Embodiment 4 (Reference Example) are shown below.

Numerical Embodiment 4 (Reference Example)
Unit: mm

Surface data

| Face number | Radius of curvature | Face spacing | Refractive index | Abbe's number |
|---|---|---|---|---|
| Object surface | ∞ | 7.7000 | | |
| 1 | 8.2676 | 0.4606 | 1.88815 | 40.76 |
| 2 | 0.6968 | 0.5510 | | |
| 3 | 5.3127 | 0.7344 | 1.73234 | 54.68 |
| 4 (Stop) | ∞ | 0.0322 | | |
| 5 | ∞ | 1.5530 | 1.81078 | 40.88 |
| 6 | −1.5718 | 0.1181 | | |
| 7 | 3.8580 | 1.2165 | 1.73234 | 54.68 |
| 8 | −1.2105 | 0.3662 | 1.93429 | 18.90 |
| 9 | −6.1306 | 0.9170 | | |
| 10 | ∞ | 1.6200 | 1.51825 | 64.14 |
| 11 | ∞ | 0 | | |
| 12 (Image plane) | ∞ | 0 | | |

Various data

| | |
|---|---|
| Focal length | 1.00005 |
| F number | 6.5017 |
| Angle of view | 150.62068° |
| Image height | 1.133 |
| Overall lens length | 7.5691 |
| Back focus | 1.9846 |

Embodiment 5

Figure 9:
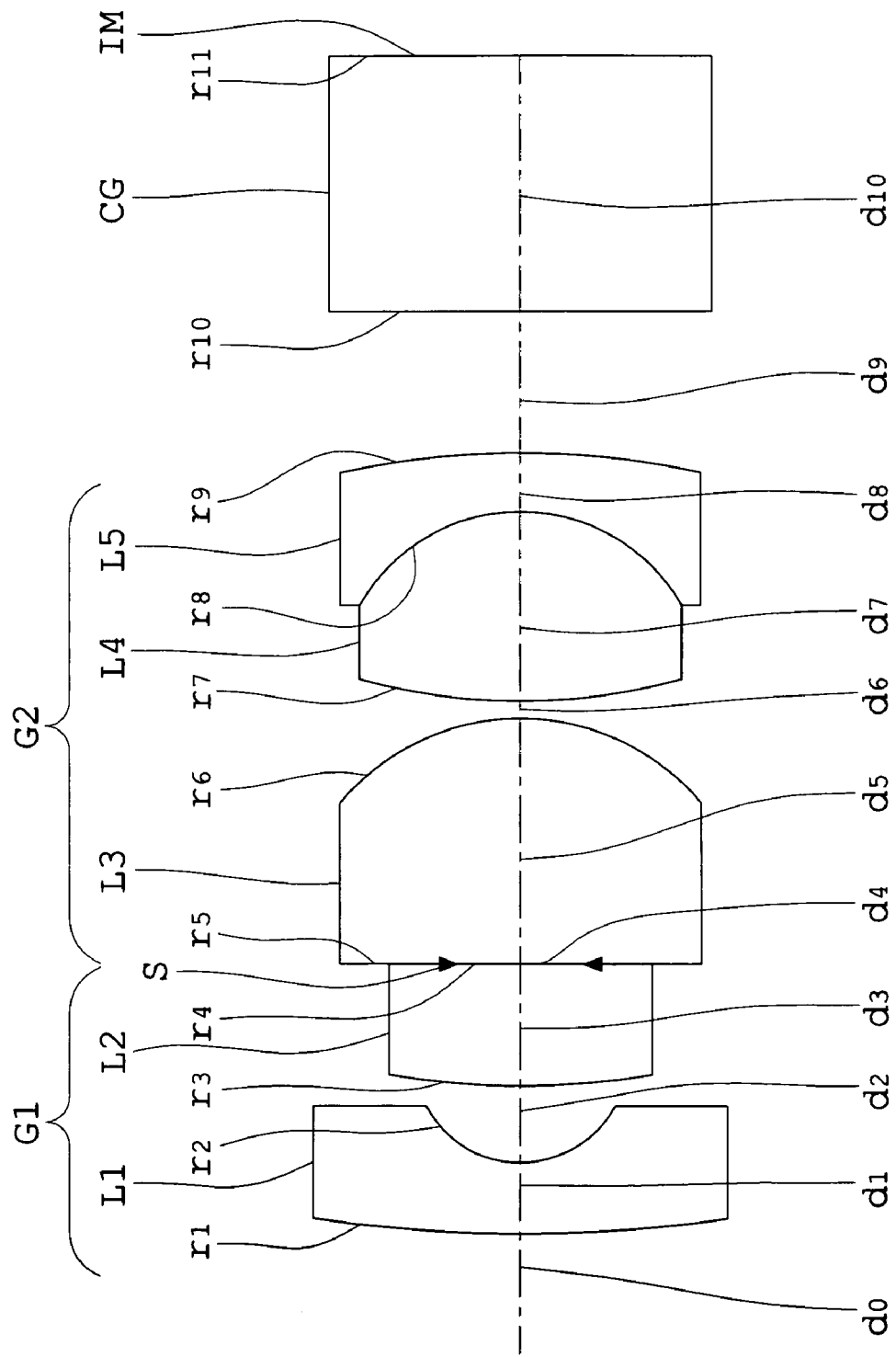
FIG. 9 is a sectional view showing an optical arrangement, developed along the optical axis, of the objective lens for endoscopes of Embodiment 5 according to the present invention.
Figure 10:
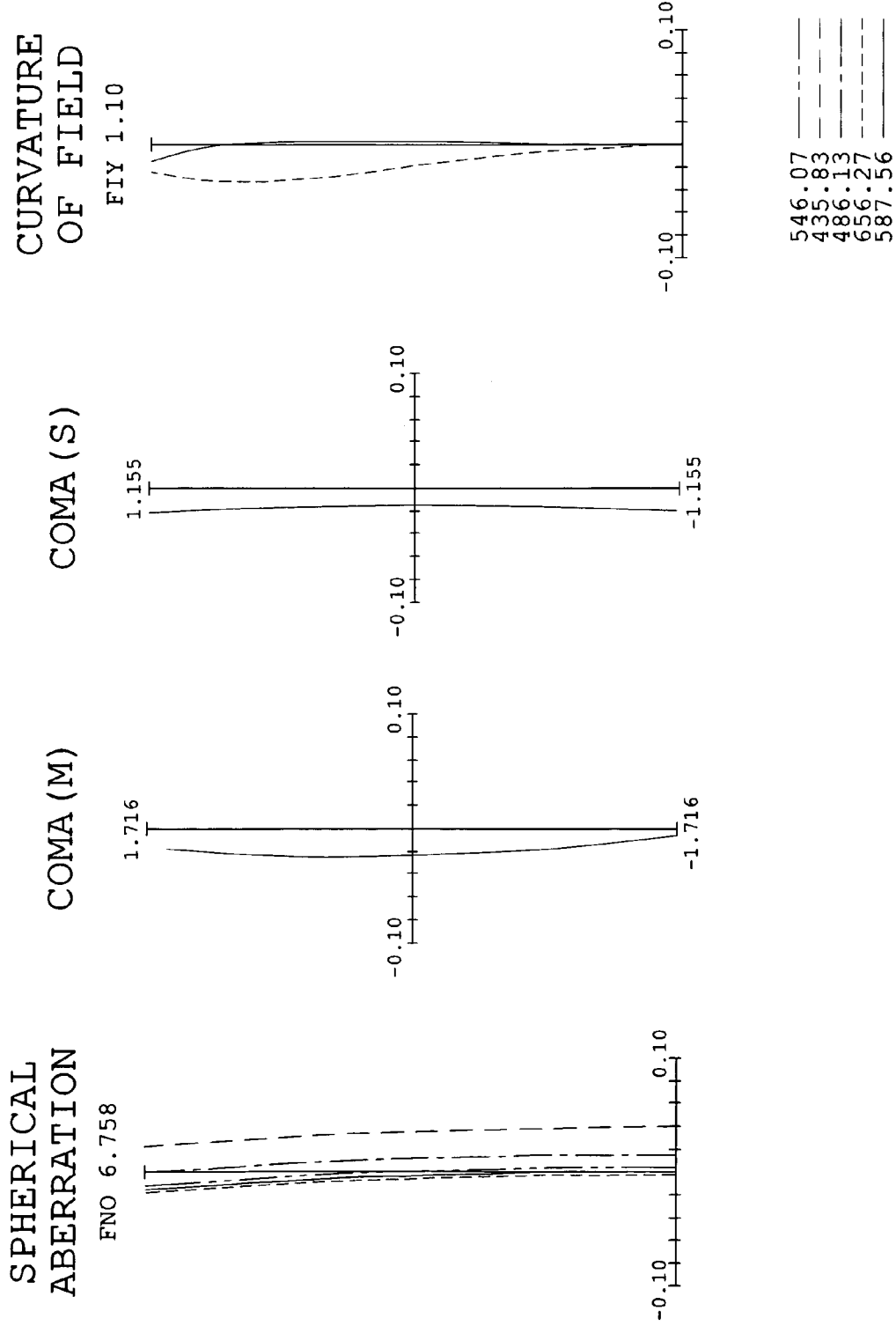
FIGS. 10A, 10B, 10C, and 10D are graphs showing spherical aberration, coma (meridional rays), coma (sagittal rays), and curvature of field, respectively, in the optical system of Embodiment 5.

FIG. 9 is a sectional view showing an optical arrangement, developed along the optical axis, of the objective lens for endoscopes of Embodiment 5 according to the present invention. FIGS. 10A, 10B, 10C, and 10D are graphs showing spherical aberration, coma (meridional rays), coma (sagittal rays), and curvature of field, respectively, in the optical system of Embodiment 5.

The objective lens for endoscopes of Embodiment 5 has the front lens unit G1 and the rear lens unit G2 with the aperture stop S between them. In FIG. 9, reference symbol CG denotes the cover glass and IM denotes the image plane.

A fundamental arrangement of lens elements in each of the front lens unit G1 and the rear lens unit G2 is almost the same as in Embodiment 1.

Subsequently, numerical data of optical members constituting the objective lens for endoscopes of Embodiment 5 are shown below.

Numerical Embodiment 5
Unit: mm

Surface data

| Face number | Radius of curvature | Face spacing | Refractive index | Abbe's number |
|---|---|---|---|---|
| Object surface | ∞ | 7.4000 | | |
| 1 | 8.0022 | 0.4458 | 1.88815 | 40.76 |
| 2 | 0.6745 | 0.4762 | | |
| 3 | 5.0367 | 0.7469 | 1.82017 | 46.62 |
| 4 (Stop) | ∞ | 0.0114 | | |
| 5 | ∞ | 1.5253 | 1.79012 | 44.20 |
| 6 | −1.4595 | 0.1143 | | |
| 7 | 3.7835 | 1.1775 | 1.73234 | 54.68 |
| 8 | −1.1593 | 0.3544 | 1.93429 | 18.90 |
| 9 | −5.9687 | 0.8900 | | |
| 10 | ∞ | 1.5600 | 1.51825 | 64.14 |
| 11 | ∞ | 0 | | |
| 12 (Image plane) | ∞ | 0 | | |

Various data

| | |
|---|---|
| Focal length | 1.00000 |
| F number | 6.7582 |
| Angle of view | 141.1172° |
| Image height | 1.096 |
| Overall lens length | 7.3018 |
| Back focus | 1.9216 |

Embodiment 6

Figure 11:
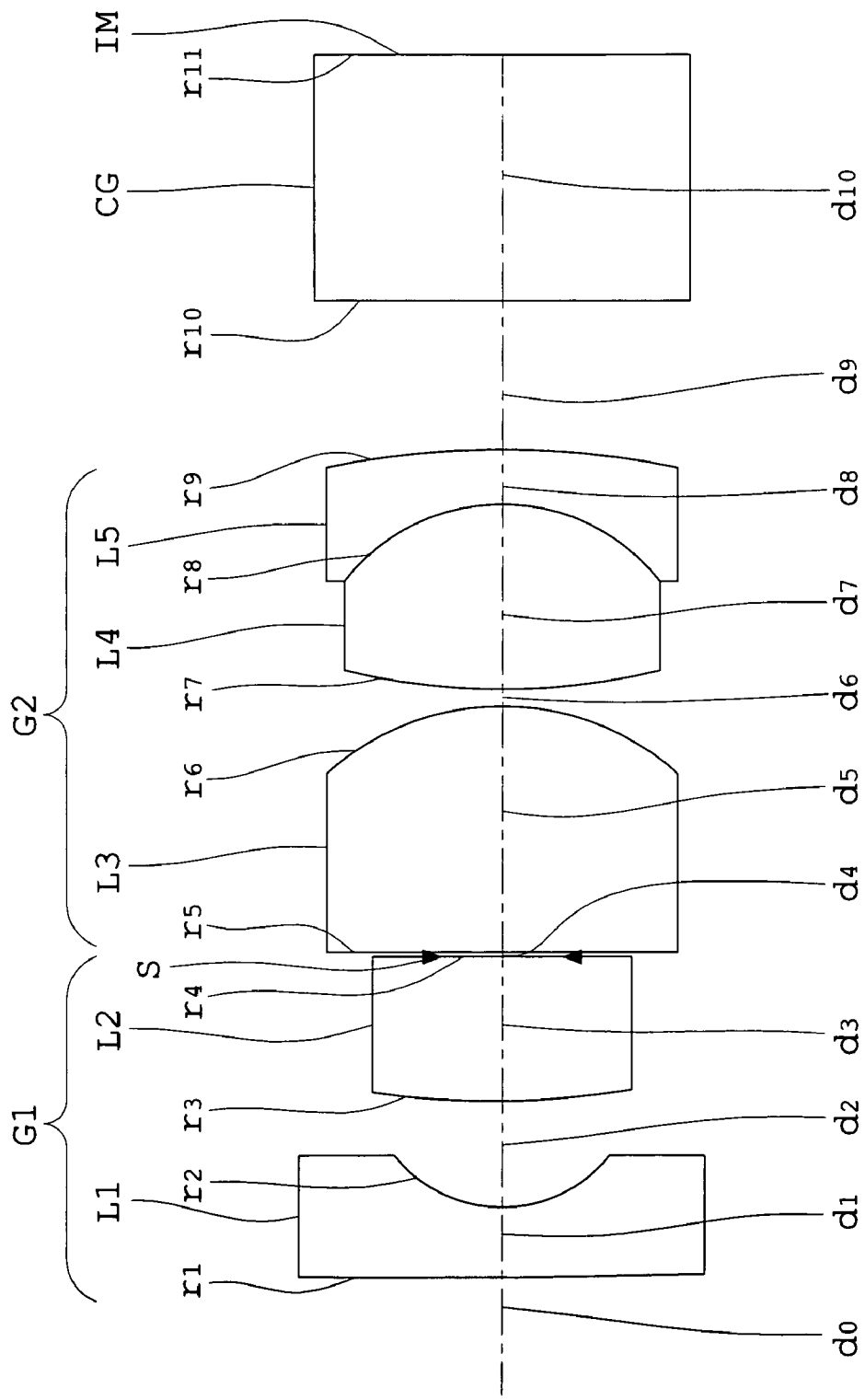
FIG. 11 is a sectional view showing an optical arrangement, developed along the optical axis, of the objective lens for endoscopes of Embodiment 6 according to the present invention.
Figure 12:
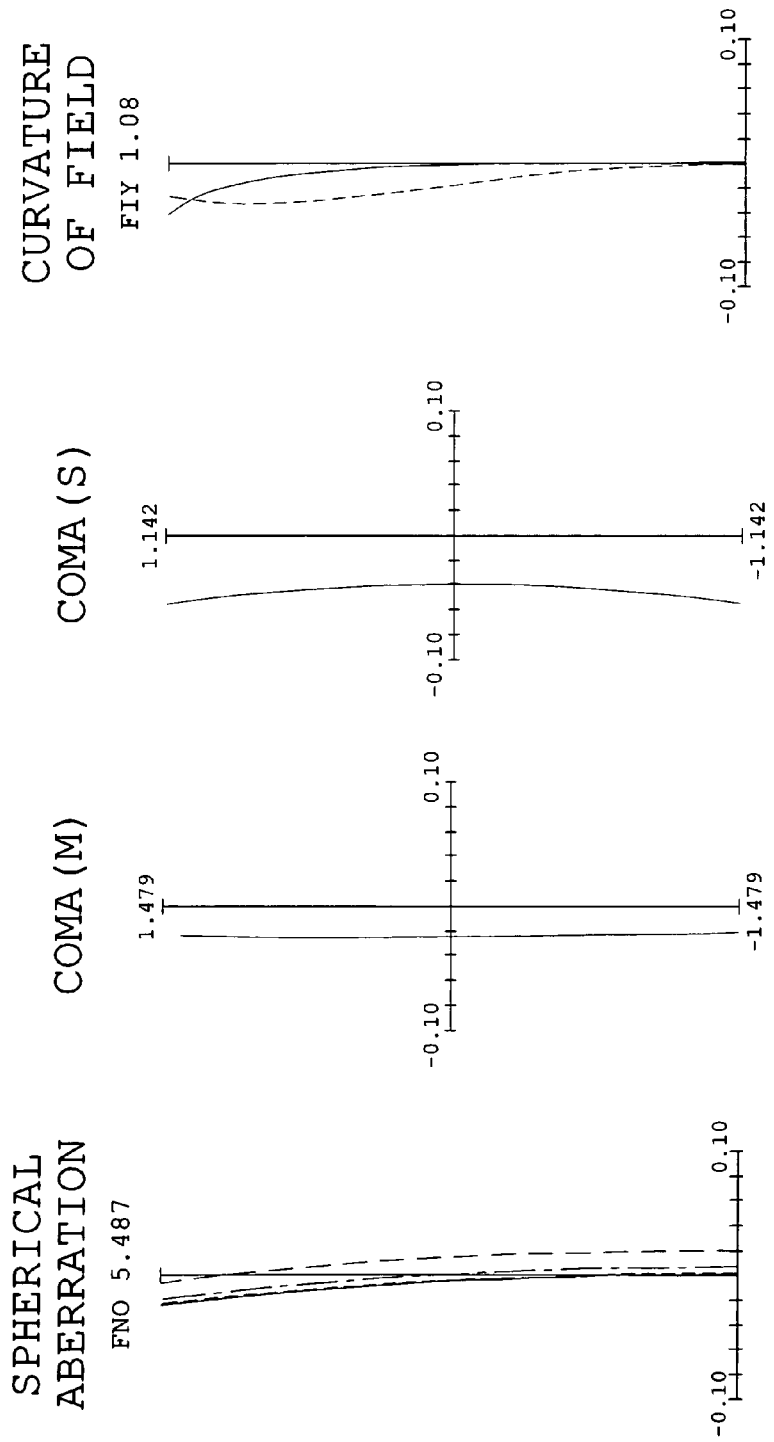
FIGS. 12A, 12B, 12C, and 12D are graphs showing spherical aberration, coma (meridional rays), coma (sagittal rays), and curvature of field, respectively, in the optical system of Embodiment 6.

FIG. 11 is a sectional view showing an optical arrangement, developed along the optical axis, of the objective lens for endoscopes of Embodiment 6 according to the present invention. FIGS. 12A, 12B, 12C, and 12D are graphs showing spherical aberration, coma (meridional rays), coma (sagittal rays), and curvature of field, respectively, in the optical system of Embodiment 6.

The objective lens for endoscopes of Embodiment 6 has the front lens unit G1 and the rear lens unit G2 with the aperture stop S between them. In FIG. 11, reference symbol CG denotes the cover glass and IM denotes the image plane. A fundamental arrangement of lens elements in each of the front lens unit G1 and the rear lens unit G2 is almost the same as in Embodiment 1.

Subsequently, numerical data of optical members constituting the objective lens for endoscopes of Embodiment 6 are shown below.

Numerical Embodiment 6
Unit: mm

Surface data

| Face number | Radius of curvature | Face spacing | Refractive index | Abbe's number |
|---|---|---|---|---|
| Object surface | ∞ | 7.4000 | | |
| 1 | 34.3018 | 0.4459 | 1.88815 | 40.76 |
| 2 | 0.8496 | 0.6935 | | |
| 3 | 5.3201 | 0.9291 | 1.83932 | 37.16 |
| 4 (Stop) | ∞ | 0.0288 | | |
| 5 | ∞ | 1.5768 | 1.81078 | 40.88 |
| 6 | −1.7172 | 0.1143 | | |
| 7 | 4.1479 | 1.1777 | 1.73234 | 54.68 |
| 8 | −1.2969 | 0.3545 | 1.93429 | 18.90 |
| 9 | −6.0600 | 0.9500 | | |
| 10 | ∞ | 1.5600 | 1.51825 | 64.14 |
| 11 | ∞ | 0 | | |
| 12 (Image plane) | ∞ | 0 | | |

Various data

| Focal length | 1.00000 |
|---|---|
| F number | 5.4873 |
| Angle of view | 154.63784° |
| Image height | 1.080 |
| Overall lens length | 7.8307 |
| Back focus | 1.9792 |

Embodiment 7

Figure 13:
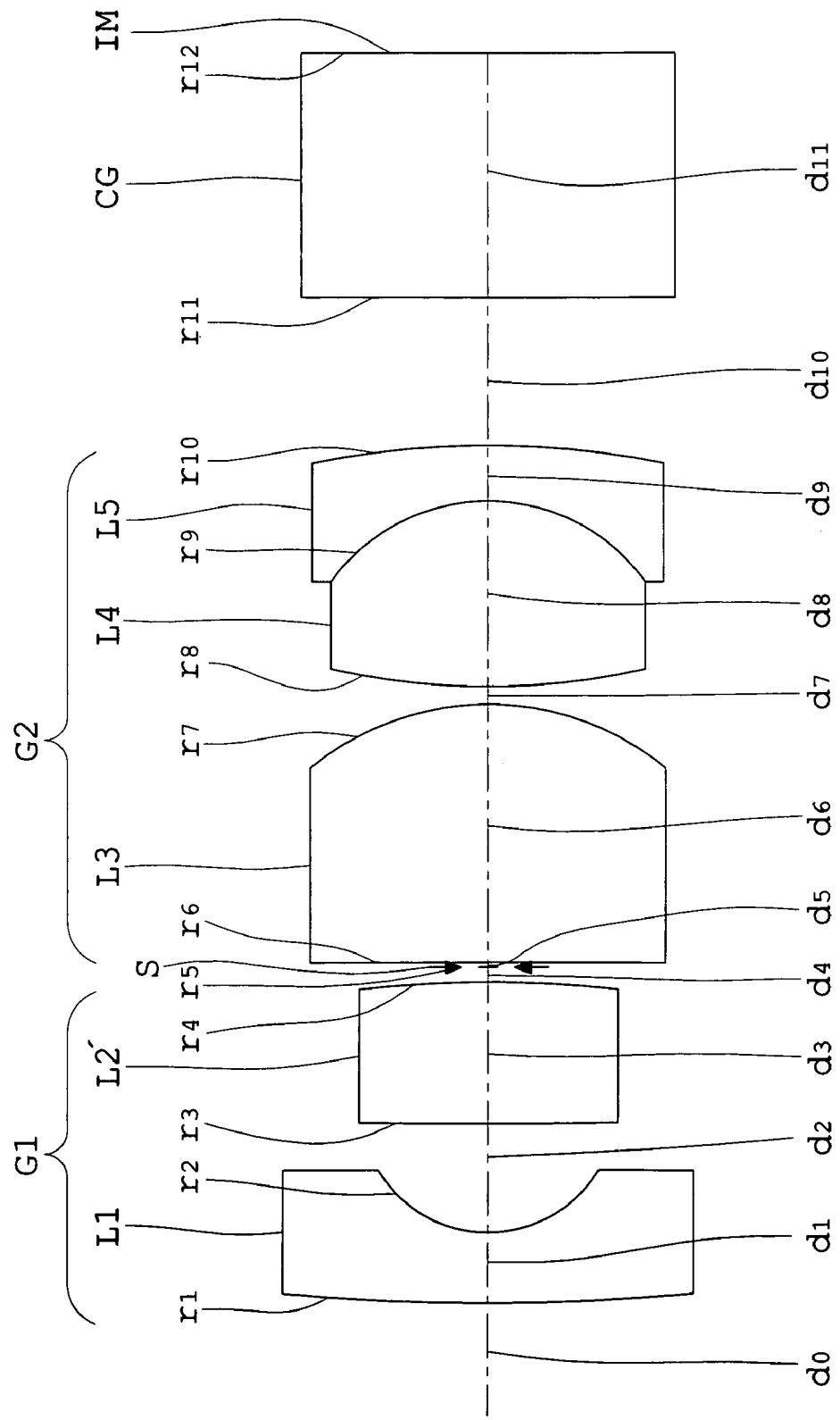
FIG. 13 is a sectional view showing an optical arrangement, developed along the optical axis, of the objective lens for endoscopes of Embodiment 7 according to the present invention.
Figure 14:
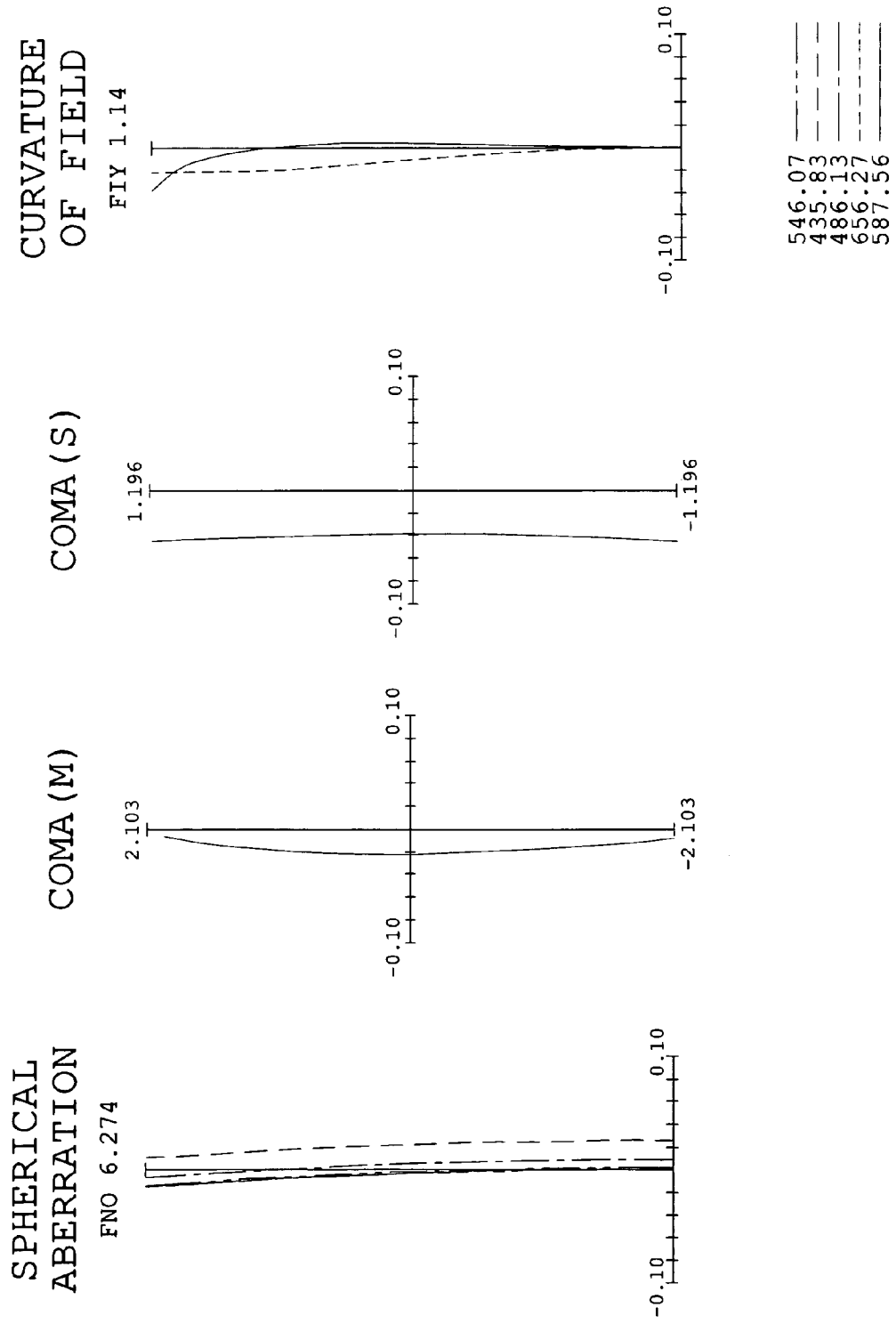
FIGS. 14A, 14B, 14C, and 14D are graphs showing spherical aberration, coma (meridional rays), coma (sagittal rays), and curvature of field, respectively, in the optical system of Embodiment 7.

FIG. 13 is a sectional view showing an optical arrangement, developed along the optical axis, of the objective lens for endoscopes of Embodiment 7 according to the present invention. FIGS. 14A, 14B, 14C, and 14D are graphs showing spherical aberration, coma (meridional rays), coma (sagittal rays), and curvature of field, respectively, in the optical system of Embodiment 7.

The objective lens for endoscopes of Embodiment 7 has the front lens unit G1 and the rear lens unit G2 with the aperture stop S between them. In FIG. 13, reference symbol CG denotes the cover glass and IM denotes the image plane. The front lens unit G1 comprises, in order from the object side, the first lens element L1 with negative refracting power of a meniscus shape, with a convex surface facing the object side and a second lens element L2' of a biconvex shape. A fundamental arrangement of lens elements in the rear lens unit G2 is almost the same as in Embodiment 1.

Subsequently, numerical data of optical members constituting the objective lens for endoscopes of Embodiment 7 are shown below.

Numerical Embodiment 7
Unit: mm

Surface data

| Face number | Radius of curvature | Face spacing | Refractive index | Abbe's number |
|---|---|---|---|---|
| Object surface | ∞ | 7.8000 | | |
| 1 | 13.0938 | 0.4642 | 1.88815 | 40.76 |
| 2 | 0.8419 | 0.7220 | | |
| 3 | 21.1224 | 0.9523 | 1.81078 | 40.88 |
| 4 | −7.1625 | 0.1071 | | |
| 5 (Stop) | ∞ | 0.0311 | | |
| 6 | ∞ | 1.7138 | 1.81078 | 40.88 |
| 7 | −1.8911 | 0.1190 | | |
| 8 | 4.4723 | 1.2261 | 1.73234 | 54.68 |
| 9 | −1.3127 | 0.3690 | 1.93429 | 18.90 |
| 10 | −6.3088 | 0.9900 | | |
| 11 | ∞ | 1.6200 | 1.51825 | 64.14 |
| 12 | ∞ | 0 | | |
| 13 (Image plane) | ∞ | 0 | | |

Various data

| Focal length | 1.00001 |
|---|---|
| F number | 6.2735 |
| Angle of view | 161.7815° |
| Image height | 1.142 |
| Overall lens length | 8.3146 |
| Back focus | 2.059 |

Embodiment 8

Figure 15:
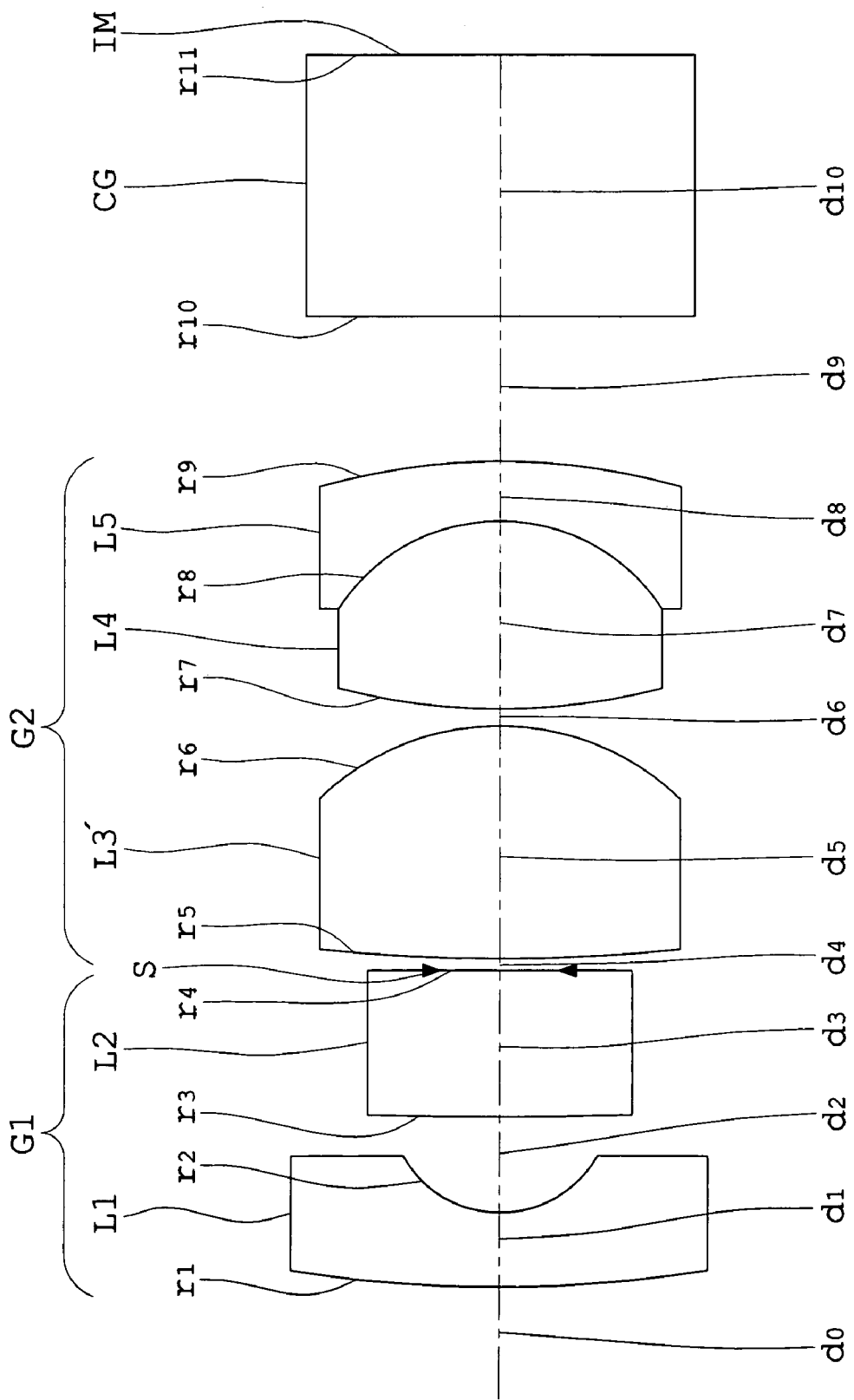
FIG. 15 is a sectional view showing an optical arrangement, developed along the optical axis, of the objective lens for endoscopes of Embodiment 8 according to the present invention.
Figure 16:
FIGS. 16A, 16B, 16C, and 16D are graphs showing spherical aberration, coma (meridional rays), coma (sagittal rays), and curvature of field, respectively, in the optical system of Embodiment 8.

FIG. 15 is a sectional view showing an optical arrangement, developed along the optical axis, of the objective lens for endoscopes of Embodiment 8 according to the present invention. FIGS. 16A, 16B, 16C, and 16D are graphs showing spherical aberration, coma (meridional rays), coma (sagittal rays), and curvature of field, respectively, in the optical system of Embodiment 8.

The objective lens for endoscopes of Embodiment 8 has the front lens unit G1 and the rear lens unit G2 with the aperture stop S between them. In FIG. 15, reference symbol CG denotes the cover glass and IM denotes the image plane. A fundamental arrangement of lens elements in the front lens unit G1 is almost the same as in Embodiment 1. The rear lens unit G2 comprises a third lens element L3' of a biconvex shape with a surface of the minor radius of curvature facing the image side, the fourth lens element of a biconvex shape, and the fifth lens element with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 8 are shown below.

Numerical Embodiment 8
Unit: mm

Surface data

| Face number | Radius of curvature | Face spacing | Refractive index | Abbe's number |
|---|---|---|---|---|
| Object surface | ∞ | 8.0000 | | |
| 1 | 8.2281 | 0.4784 | 1.88815 | 40.76 |

-continued

Numerical Embodiment 8
Unit: mm

| | | | | |
|---|---|---|---|---|
| 2 | 0.7437 | 0.6336 | | |
| 3 | 18.3990 | 0.9813 | 1.81078 | 40.88 |
| 4 (Stop) | ∞ | 0.0736 | | |
| 5 | 11.4280 | 1.5260 | 1.83922 | 37.16 |
| 6 | −1.7904 | 0.1227 | | |
| 7 | 4.2883 | 1.2373 | 1.69661 | 53.21 |
| 8 | −1.2965 | 0.3803 | 1.93429 | 18.90 |
| 9 | −5.0135 | 0.9700 | | |
| 10 | ∞ | 1.7053 | 1.51825 | 64.14 |
| 11 | ∞ | 0 | | |
| 12 (Image plane) | ∞ | 0 | | |

Various data

| | |
|---|---|
| Focal length | 1.00000 |
| F number | 6.2386 |
| Angle of view | 147.79232° |
| Image height | 1.117 |
| Overall lens length | 8.1084 |
| Back focus | 2.1043 |

Embodiment 9

Figure 17:
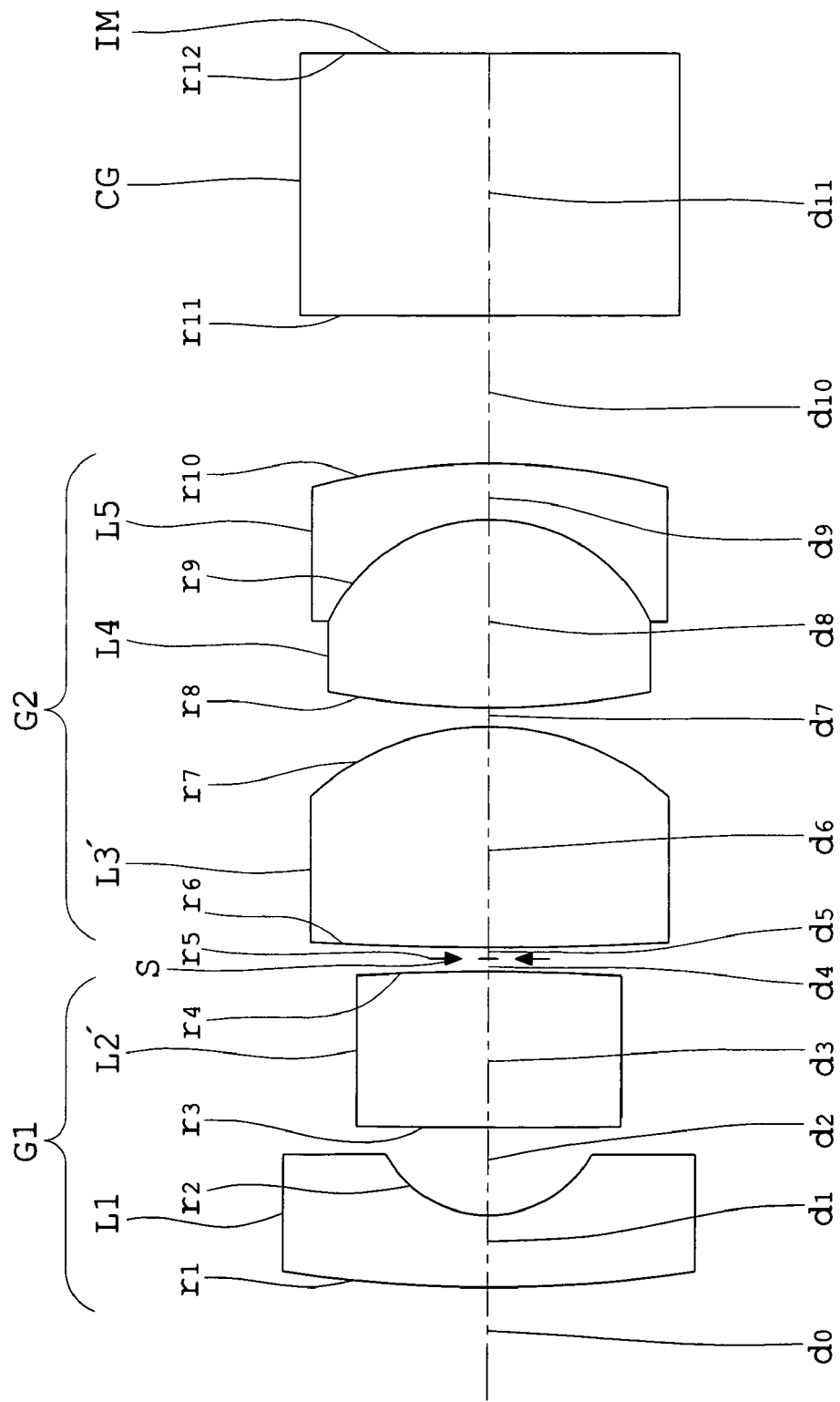
FIG. 17 is a sectional view showing an optical arrangement, developed along the optical axis, of the objective lens for endoscopes of Embodiment 9 according to the present invention.
Figure 18:
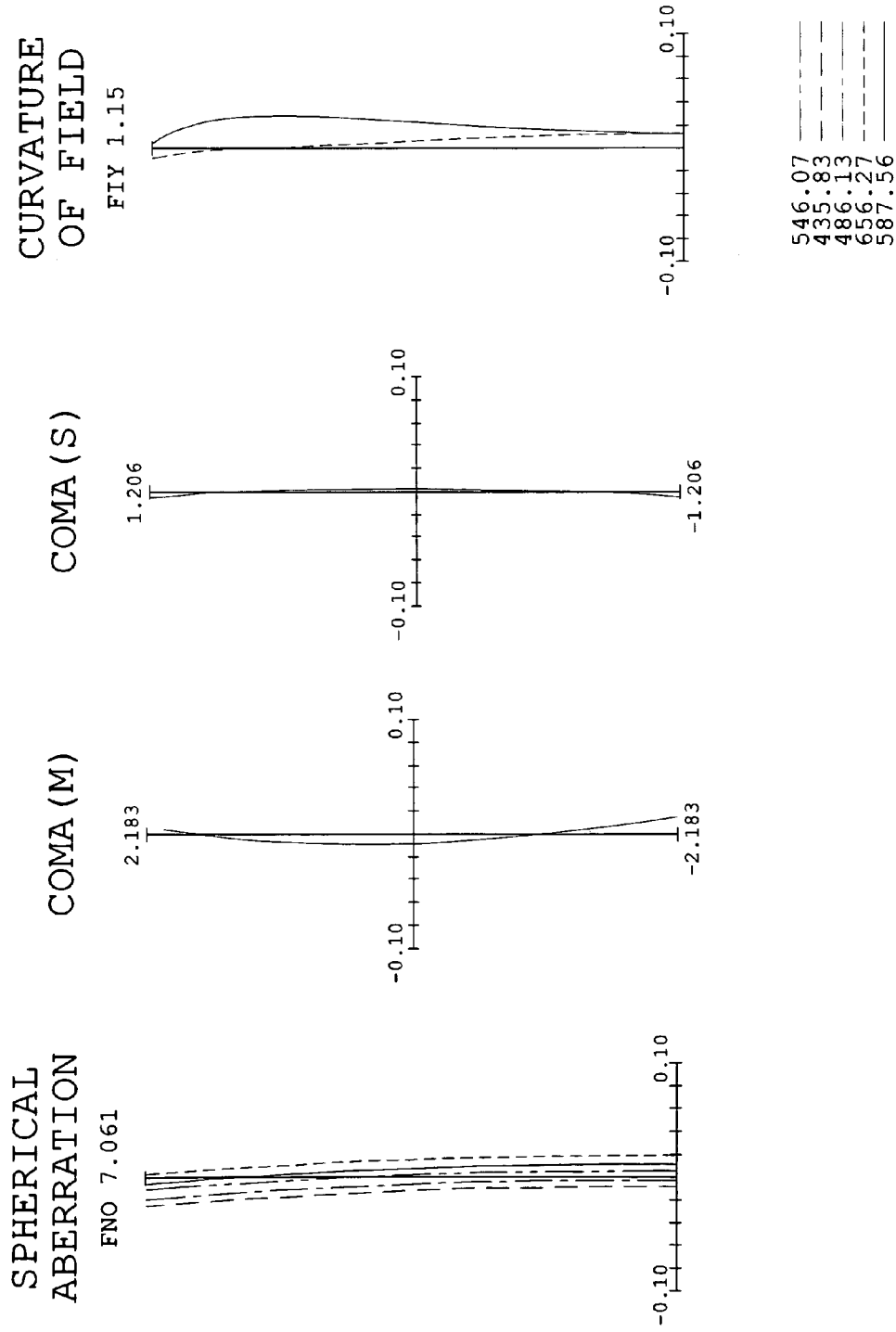
FIGS. 18A, 18B, 18C, and 18D are graphs showing spherical aberration, coma (meridional rays), coma (sagittal rays), and curvature of field, respectively, in the optical system of Embodiment 9.

FIG. 17 is a sectional view showing an optical arrangement, developed along the optical axis, of the objective lens for endoscopes of Embodiment 9 according to the present invention. FIGS. 18A, 18B, 18C, and 18D are graphs showing spherical aberration, coma (meridional rays), coma (sagittal rays), and curvature of field, respectively, in the optical system of Embodiment 9.

The objective lens for endoscopes of Embodiment 9 has the front lens unit G1 and the rear lens unit G2 with the aperture stop S between them. In FIG. 17, reference symbol CG denotes the cover glass and IM denotes the image plane. The front lens unit G1 comprises, in order from the object side, the first lens element L1 with negative refracting power of a meniscus shape, with a convex surface facing the object side and the second lens element L2' of a biconvex shape. The rear lens unit G2 comprises the third lens element L3' of a biconvex shape with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented. Here, for example, when the equivalent-air medium length in which the thickness of the cover glass CG is added to air spacing with the cemented lens component is constant, there is no movement of the image plane. Consequently, in the objective lens for endoscopes of any embodiment, the thickness of the cover glass may be increased so that the air spacing with the cemented lens component is reduced accordingly, and vice versa. The cover glass may be replaced with a prism so that the optical path is changed and the image plane is inclined with respect to the optical axis.

Subsequently, numerical data of optical members constituting the objective lens for endoscopes of Embodiment 9 are shown below.

Numerical Embodiment 9
Unit: mm

Surface data

| Face number | Radius of curvature | Face spacing | Refractive index | Abbe's number |
|---|---|---|---|---|
| Object surface | ∞ | 8.0000 | | |
| 1 | 8.0788 | 0.4697 | 1.88815 | 40.76 |
| 2 | 0.7513 | 0.5966 | | |
| 3 | 37.9360 | 1.0292 | 1.93429 | 18.90 |
| 4 | −20.8171 | 0.0843 | | |
| 5 (Stop) | ∞ | 0.0723 | | |
| 6 | 16.5048 | 1.4805 | 1.81078 | 40.88 |
| 7 | −1.7275 | 0.1204 | | |
| 8 | 5.0185 | 1.2405 | 1.68082 | 55.34 |
| 9 | −1.1734 | 0.3734 | 1.85504 | 23.78 |
| 10 | −4.8178 | 0.9778 | | |
| 11 | ∞ | 1.7298 | 1.51825 | 64.14 |
| 12 | ∞ | 0 | | |
| 13 (Image plane) | ∞ | 0 | | |

Various data

| | |
|---|---|
| Focal length | 1.00000 |
| F number | 7.0606 |
| Angle of view | 154.45004° |
| Image height | 1.155 |
| Overall lens | 8.1744 |
| Back focus | 2.124 |

Embodiment 10

Figure 19:
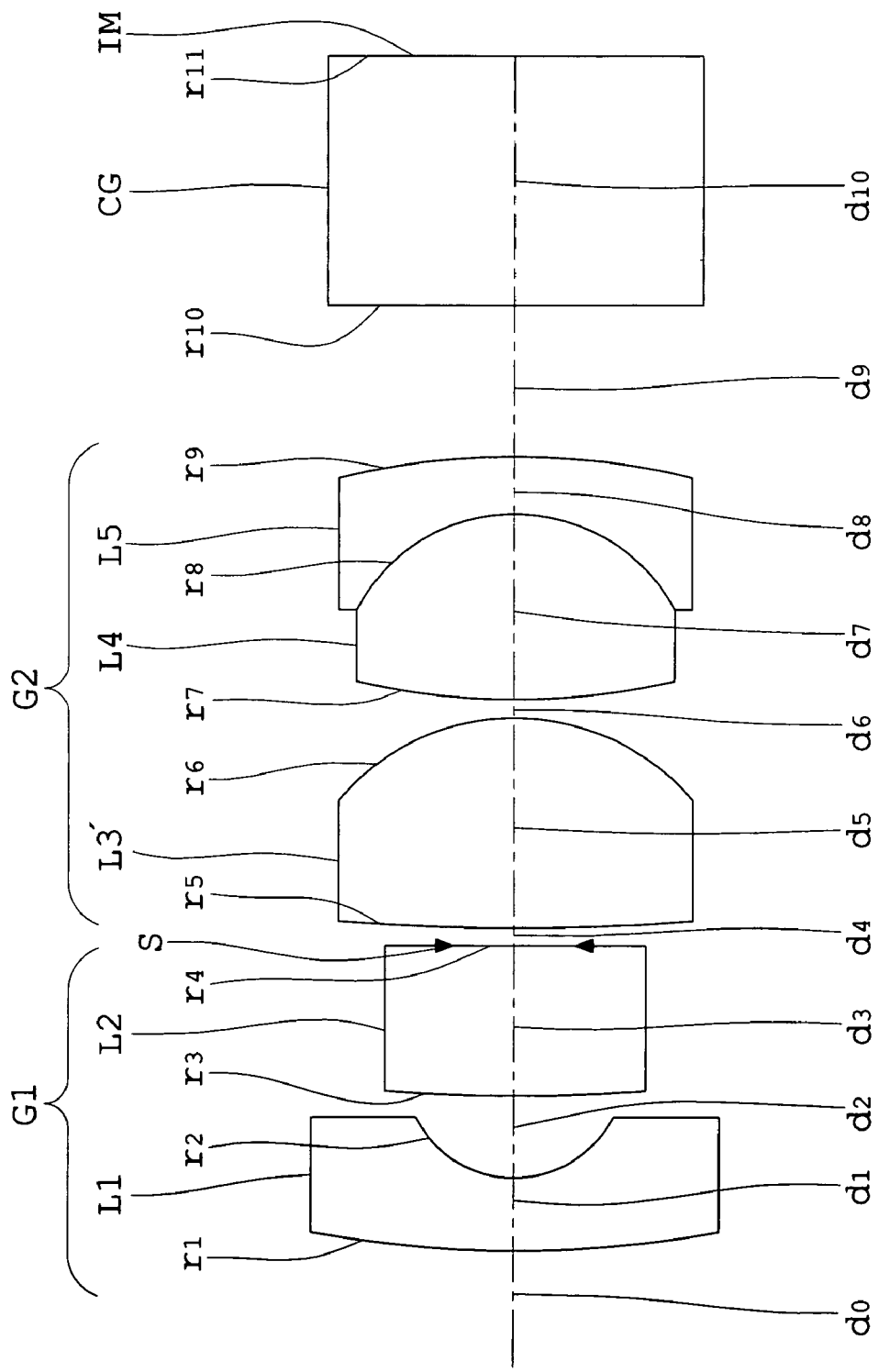
FIG. 19 is a sectional view showing an optical arrangement, developed along the optical axis, of the objective lens for endoscopes of Embodiment 10 according to the pre-sent invention.

FIG. 19 is a sectional view showing an optical arrangement, developed along the optical axis, of the objective lens for endoscopes of Embodiment 10 according to the pre-sent invention. FIGS. 20A, 20B, 20C, and 20D are graphs showing spherical aberration, coma (meridional rays), coma (sagittal rays), and curvature of field, respectively, in the optical system of Embodiment 10.

The objective lens for endoscopes of Embodiment 10 has the front lens unit G1 and the rear lens unit G2 with the aperture stop S between them. In FIG. 19, reference symbol CG denotes the cover glass and IM denotes the image plane. A fundamental arrangement of lens elements in the front lens unit G1 is almost the same as in Embodiment 1. The rear lens unit G2 comprises the third lens element L3' of a biconvex shape with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 10 are shown below.

Numerical Embodiment 10
Unit: mm

Surface data

| Face number | Radius of curvature | Face spacing | Refractive index | Abbe's number |
|---|---|---|---|---|
| Object surface | ∞ | 7.5000 | | |
| 1 | 7.8275 | 0.4551 | 1.88815 | 40.76 |

-continued

Numerical Embodiment 10
Unit: mm

| | | | | |
|---|---|---|---|---|
| 2 | 0.7076 | 0.5327 | | |
| 3 | 10.2259 | 0.9734 | 1.88815 | 40.76 |
| 4 (Stop) | ∞ | 0.1050 | | |
| 5 | 11.7457 | 1.3614 | 1.74706 | 27.79 |
| 6 | −1.5076 | 0.1167 | | |
| 7 | 4.3255 | 1.2019 | 1.73234 | 54.68 |
| 8 | −1.1669 | 0.3618 | 1.93429 | 18.90 |
| 9 | −5.4787 | 0.9800 | | |
| 10 | ∞ | 1.5889 | 1.51825 | 64.14 |
| 11 | ∞ | 0 | | |
| 12 (Image plane) | ∞ | 0 | | |

Various data

| | |
|---|---|
| Focal length | 1.00000 |
| F number | 6.4817 |
| Angle of view | 143.60554° |
| Image height | 1.110 |
| Overall lens length | 7.6768 |
| Back focus | 2.0353 |

Embodiment 11

Figure 21:
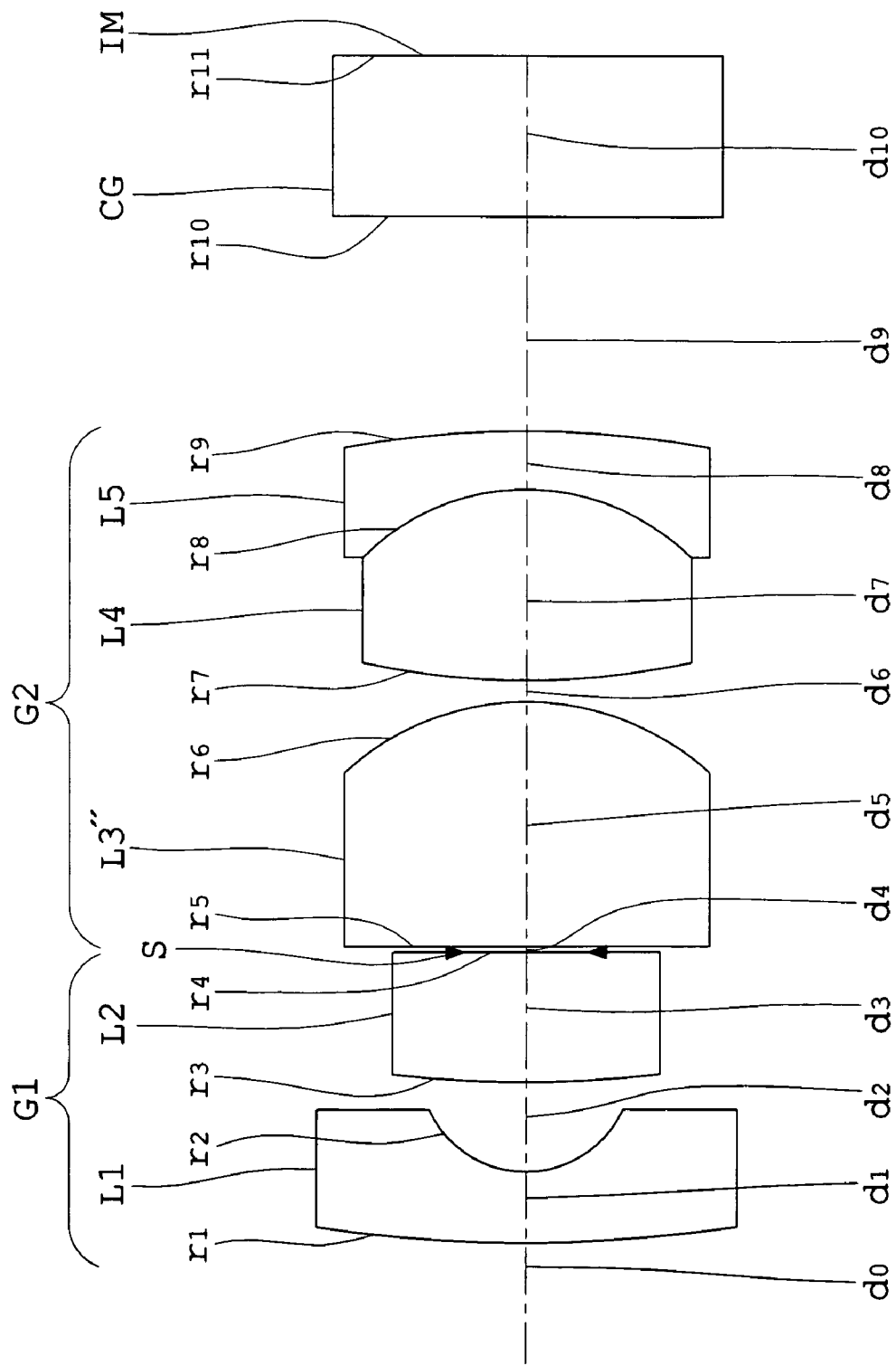
FIG. 21 is a sectional view showing an optical arrangement, developed along the optical axis, of the objective lens for endoscopes of Embodiment 11 according to the pre-sent invention.
Figure 22:
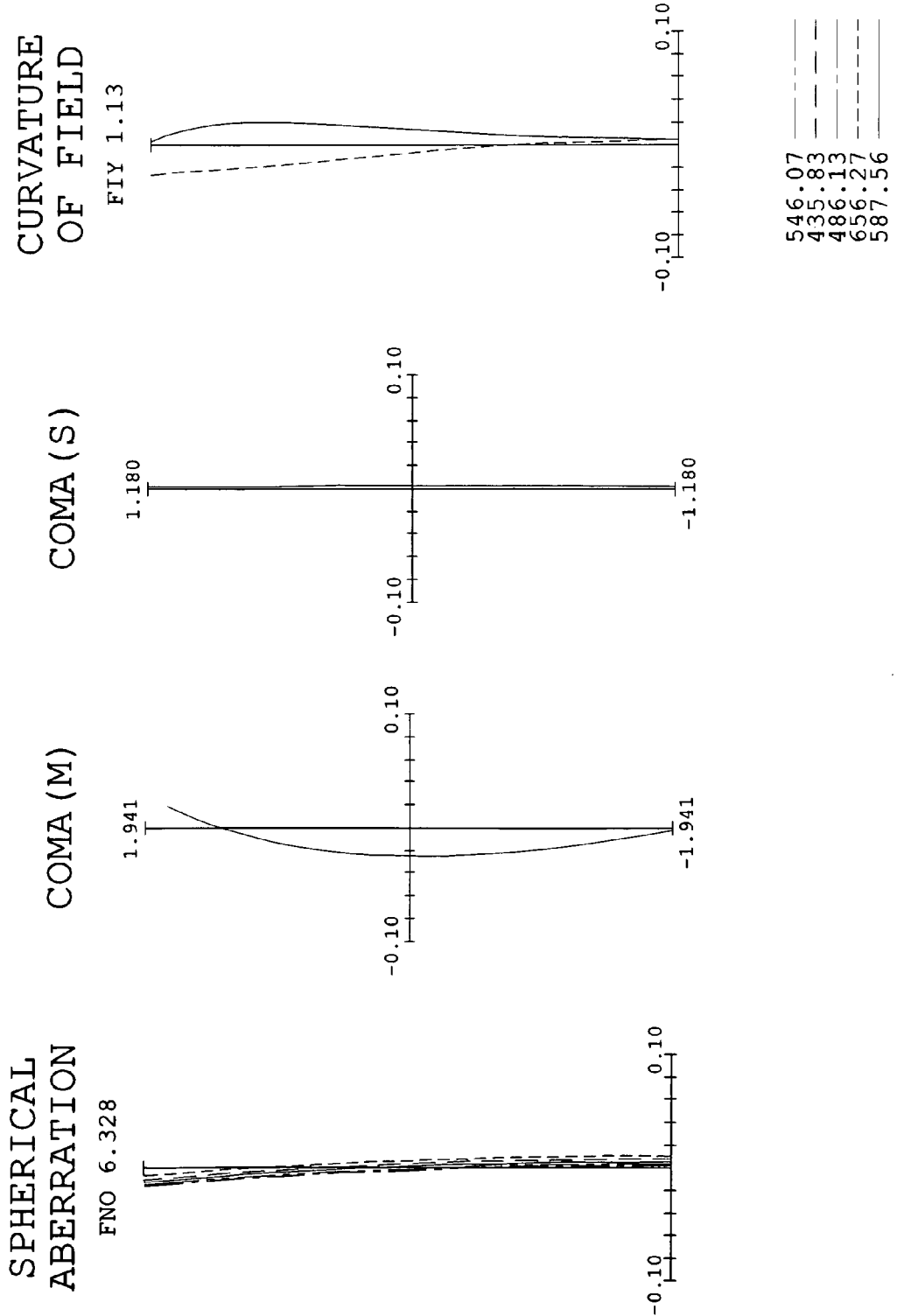
FIGS. 22A, 22B, 22C, and 22D are graphs showing spherical aberration, coma (meridional rays), coma (sagittal rays), and curvature of field, respectively, in the optical system of Embodiment 11.

FIG. 21 is a sectional view showing an optical arrangement, developed along the optical axis, of the objective lens for endoscopes of Embodiment 11 according to the present invention. FIGS. 22A, 22B, 22C, and 22D are graphs showing spherical aberration, coma (meridional rays), coma (sagittal rays), and curvature of field, respectively, in the optical system of Embodiment 11.

The objective lens for endoscopes of Embodiment 11 has the front lens unit G1 and the rear lens unit G2 with the aperture stop S between them. In FIG. 21, reference symbol CG denotes the cover glass and IM denotes the image plane. A fundamental arrangement of lens elements in the front lens unit G1 is almost the same as in Embodiment 1. The rear lens unit G2 comprises a third lens element L3'' of a plano-convex shape whose object-side surface is flat and whose image-side surface is aspherical and convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

In the objective lens for endoscopes of Embodiment 11, as seen from Table 1 described later, values of condition parameters are within the scope of claim 1 so that there is no need to use the aspherical surface. When the objective lens for endoscopes of Embodiment 11 is compared with that of Embodiment 4, the values of the condition parameters are very similar to each other and the angles of view are nearly the same specification. In short, as the specification of the objective lens for endoscopes, Embodiment 4 is very similar to Embodiment 11.

Here, when FIG. 7 which is the sectional view showing an optical arrangement, developed along the optical axis, of the objective lens for endoscopes of Embodiment 4 is compared with FIG. 21 which is the sectional view showing an optical arrangement, developed along the optical axis, of the objective lens for endoscopes of Embodiment 11, it is found that there is a large difference in curvature R of the image-side surface of the fourth lens element L4 cemented and the objective lens for endoscopes of Embodiment 11 introducing the aspherical lens can make the curvature of the image-side surface of the fourth lens element L4 more large so that the workability of the fourth lens element L4 is considerably improved. As mentioned above, when the values of the condition parameters are within the scope of claim 1, the aspherical lens is not necessarily required, but in the case where productivity, such as the improvement of the lens workability, is considered, the merit of introducing the aspherical surface can be found even when the values of the condition parameters are within the scope of claim 1. In the objective lens for endoscopes of Embodiment 11, although the values of the condition parameters are within the scope of claim 1, the aspherical lens is introduced. Whereby, the workability of the curvature of the image-side surface of the fourth lens element L4 can be improved. Also, the effect of the improvement on the workability brought about by using the aspherical lens is not limited to the cemented lens component, but is secured with respect to other spherical lenses.

Subsequently, numerical data of optical members constituting the objective lens for endoscopes of Embodiment 11 are shown below. Also, a rotational symmetrical aspherical surface shown in the numerical data described below is defined by the following equation:

$$Z = ch^2 / \left[1 + \sqrt{\{1 - (1+k)c^2 h^2\}}\right] + A2h^2 + A4h^4 + A6h^6 + A8h^8 + A10h^{10} + A12h^{12} + A14h^{14} + A16h^{16} + A18h^{18} + A20h^{20} \ldots$$

where c is the curvature of a lens surface at the vertex; k is a conic constant; A2, A4, A6, A8, A10, A12, A14, A16, A18, and A20 are second, fourth, sixth, eighth, tenth, twelfth, fourteenth, sixteenth, eighteenth, and twentieth order aspherical coefficients, respectively, and h is a distance from the optical axis and is expressed by $h^2 = x^2 + y^2$, where x is a horizontal direction in a plane perpendicular to the optical axis and y is a vertical direction. The definition equation of this aspherical surface holds for each of the embodiments described below.

Numerical Embodiment 11
Unit: mm

Surface data

| Face number | Radius of curvature | Face spacing | Refractive index | Abbe's number |
|---|---|---|---|---|
| Object surface | ∞ | 8.0000 | | |
| 1 | 7.8792 | 0.4581 | 1.88815 | 40.76 |
| 2 | 0.6923 | 0.5480 | | |
| 3 | 6.0626 | 0.8222 | 1.81078 | 40.88 |
| 4 (Stop) | ∞ | 0.0355 | | |
| 5 | ∞ | 1.5495 | 1.81078 | 40.88 |
| 6 (Aspherical surface) | −1.5499 | 0.1175 | | |
| 7 | 4.2882 | 1.2098 | 1.73234 | 54.68 |
| 8 | −1.4682 | 0.3641 | 1.93429 | 18.90 |
| 9 | −7.1899 | 1.3600 | | |
| 10 | ∞ | 1.0000 | 1.51825 | 64.14 |
| 11 | ∞ | 0 | | |
| 12 (Image plane) | ∞ | 0 | | |

Aspherical data
Sixth surface k = 0
A2 = 0.0000E+00, A4 = 6.1204E−03, A6 = 4.1123E−03,
A8 = 1.3460E−02 A10 = 0.0000E+00, A12 = 0.0000E+00,
A14 = 0.0000E+00, A16 = 0.0000E+00, A18 = 0.0000E+00,
A20 = 0.0000E+00

-continued

Numerical Embodiment 11
Unit: mm

Various data

| Focal length | 1.00005 |
| --- | --- |
| F number | 6.3276 |
| Angle of view | 148.96666° |
| Image height | 1.130 |
| Overall lens length | 7.4647 |
| Back focus | 2.0219 |

Here, in the case where the objective lens for endoscopes of the same specification (for example, the same angle of view) is considered, if the first lens element has no negative meniscus shape and is configured as a plano-concave lens element that has been often adopted in the conventional objective lens for endoscopes, there is no need to diminish the radius of curvature of the image-side surface of the third lens element with positive refracting power, with a surface of the minor radius of curvature facing the image side. In contrast to this, like the present invention, in order to keep the variation of the angle of view as an important subject in the objective lens for endoscopes to a minimum to hold the angle of view used for the objective lens for endoscopes (satisfying Condition (2)) without enlarging the lens element (and satisfying Condition (1) or (1')) while configuring the most object-side lens element of the front lens unit G1 into the meniscus shape with negative refracting power in the objective lens for endoscopes, somewhat high power is required for the third lens element with positive refracting power, with a surface of the minor radius of curvature facing the image side and the radius of curvature of the image-side surface of the third lens element becomes smaller than the specification.

In such an arrangement, from the viewpoint of correction for aberration, the influence on the surface of the minor radius of curvature of the third lens element is great and correction for curvature of field is particularly difficult. From this fact, when the surface of the minor radius of curvature of the third lens element is configured as the aspherical surface, it become necessary that the curvature is moderated in going from the center to the periphery. In short, like the objective lens for endoscopes of Embodiment 11, each order aspherical coefficient where the surface of the minor radius of curvature of the third lens element L3" is configured as the aspherical surface is always zero or more.

Embodiment 12

Figure 23:
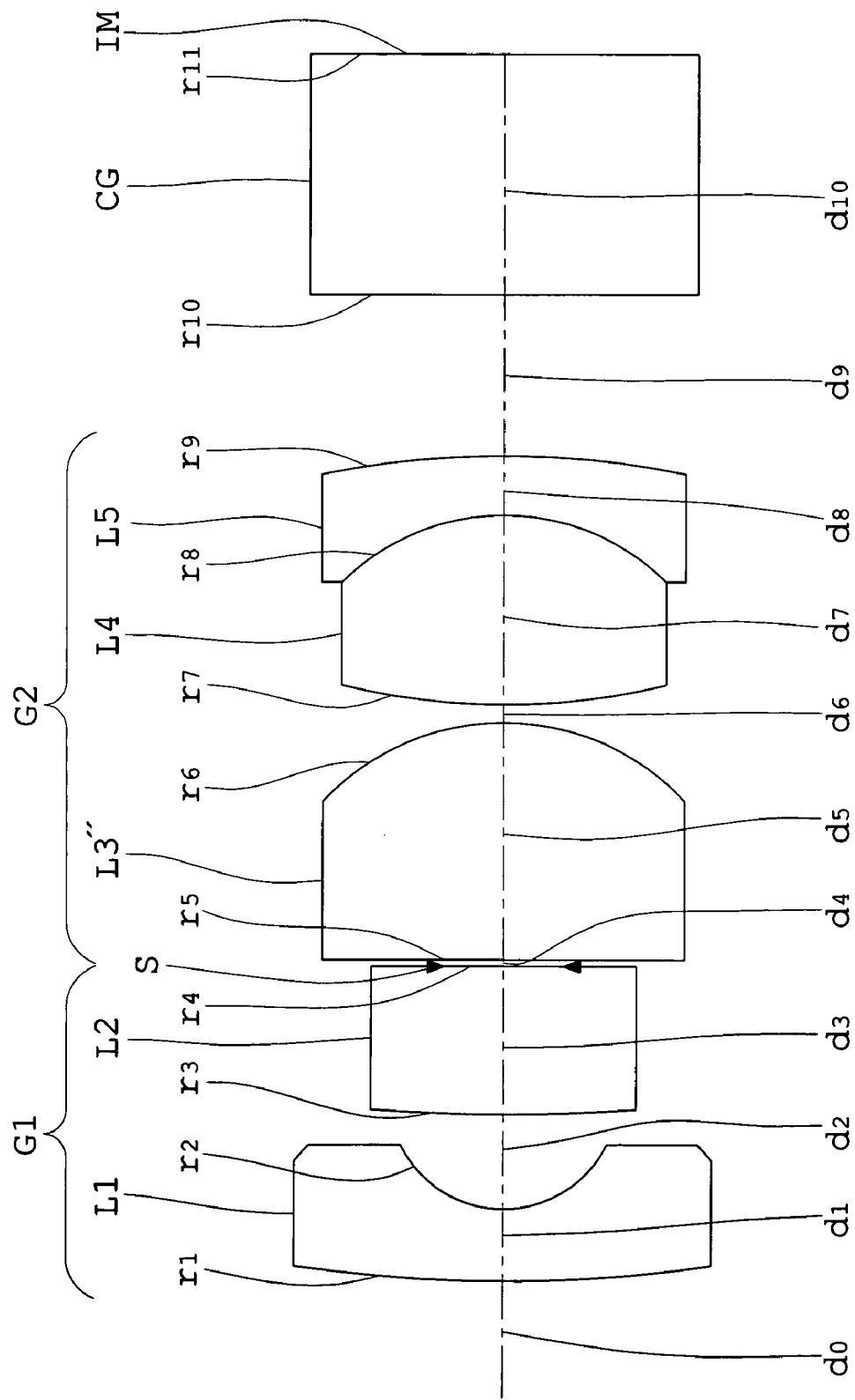
FIG. 23 is a sectional view showing an optical arrangement, developed along the optical axis, of the objective lens for endoscopes of Embodiment 12 according to the pre-sent invention.

FIG. 23 is a sectional view showing an optical arrangement, developed along the optical axis, of the objective lens for endoscopes of Embodiment 12 according to the pre-sent invention. FIGS. 24A, 24B, 24C, and 24D are graphs showing spherical aberration, coma (meridional rays), coma (sagittal rays), and curvature of field, respectively, in the optical system of Embodiment 12.

The objective lens for endoscopes of Embodiment 12 has the front lens unit G1 and the rear lens unit G2 with the aperture stop S between them. In FIG. 23, reference symbol CG denotes the cover glass and IM denotes the image plane. A fundamental arrangement of lens elements in the front lens unit G1 is almost the same as in Embodiment 1. The rear lens unit G2 comprises the third lens element L3" of a plano-convex shape whose object-side surface is flat and whose image-side surface is aspherical and convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 12 are shown below.

Numerical Embodiment 12
Unit: mm

Surface data

| Face number | Radius of curvature | Face spacing | Refractive index | Abbe's number |
| --- | --- | --- | --- | --- |
| Object surface | ∞ | 8.0000 | | |
| 1 | 8.2183 | 0.4778 | 1.88815 | 40.76 |
| 2 | 0.7498 | 0.6328 | | |
| 3 | 9.5986 | 0.9801 | 1.81078 | 40.88 |
| 4 (Stop) | ∞ | 0.0251 | | |
| 5 | ∞ | 1.5696 | 1.76651 | 40.10 |
| 6 (Aspherical surface) | −1.5933 | 0.1225 | | |
| 7 | 4.2057 | 1.2619 | 1.73234 | 54.68 |
| 8 | −1.5314 | 0.3798 | 1.93429 | 18.90 |
| 9 | −7.0266 | 1.0700 | | |
| 10 | ∞ | 1.5786 | 1.51825 | 64.14 |
| 11 | ∞ | 0 | | |
| 12 (Image plane) | ∞ | 0 | | |

Aspherical data
Sixth surface k = 0
A2 = 0.0000E+00, A4 = 5.7922E−03, A6 = 0.0000E+00,
A8 = 9.0000E−03, A10 = 0.0000E+00, A12 = 0.0000E+00,
A14 = 0.0000E+00, A16 = 0.0000E+00, A18 = 0.0000E+00,
A20 = 0.0000E+00

Various data

| Focal length | 0.99998 |
| --- | --- |
| F number | 5.9335 |
| Angle of view | 160.37002° |
| Image height | 1.170 |
| Overall lens length | 8.0982 |
| Back focus | 2.1196 |

In the objective lens for endoscopes of Embodiment 12, fourth and eighth order aspherical coefficients are used, but both are zero or more. As in this embodiment, by using only fourth and eighth order coefficients, only fourth and sixth order coefficients, or only the fourth order coefficient, aberration can be corrected and these coefficients are always zero or more.

Embodiment 13

Figure 25:
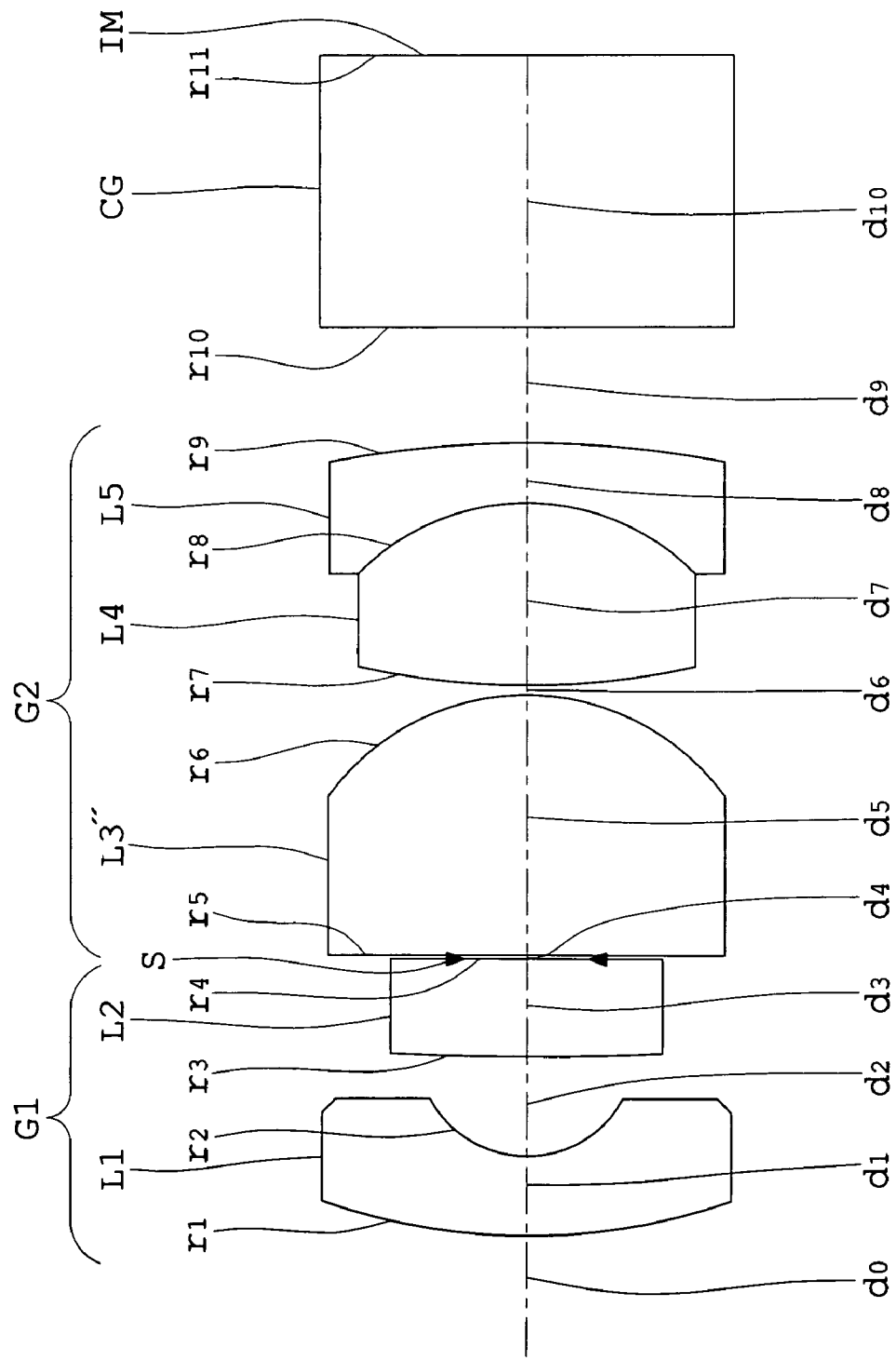
FIG. 25 is a sectional view showing an optical arrangement, developed along the optical axis, of the objective lens for endoscopes of Embodiment 13 according to the pre-sent invention.
Figure 26:
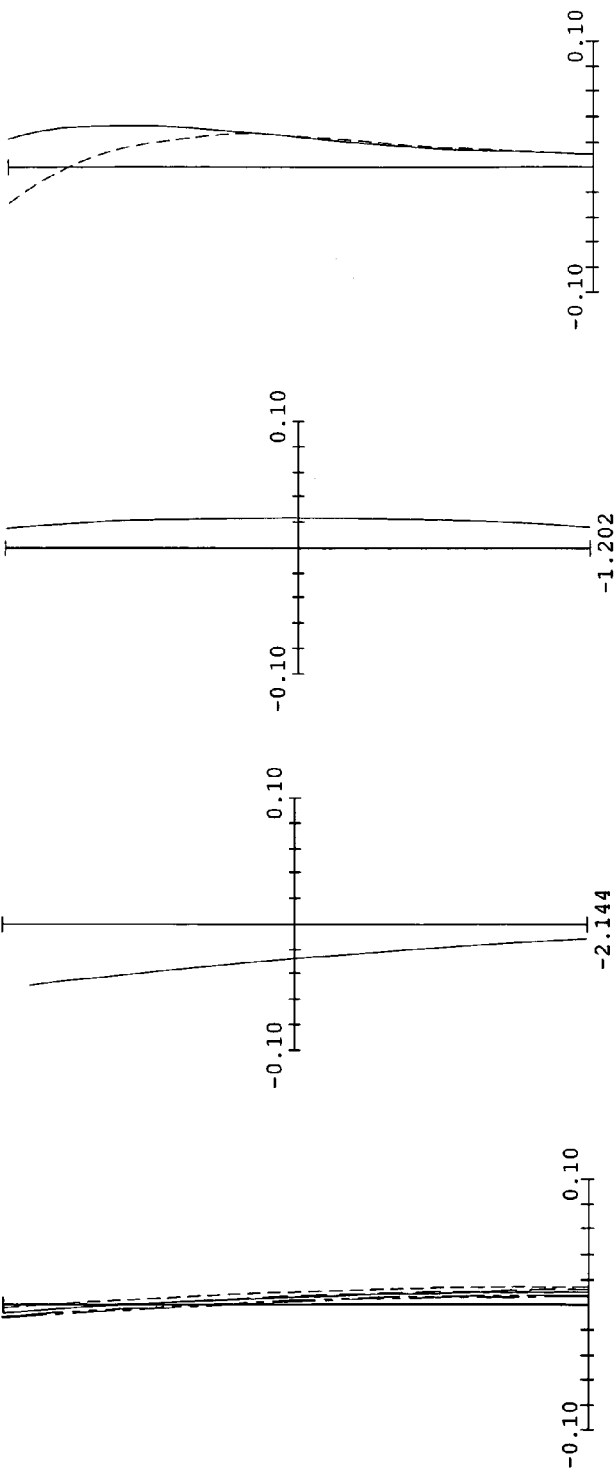
FIGS. 26A, 26B, 26C, and 26D are graphs showing spherical aberration, coma (meridional rays), coma (sagittal rays), and curvature of field, respectively, in the optical system of Embodiment 13.

FIG. 25 is a sectional view showing an optical arrangement, developed along the optical axis, of the objective lens for endoscopes of Embodiment 13 according to the pre-sent invention. FIGS. 26A, 26B, 26C, and 26D are graphs showing spherical aberration, coma (meridional rays), coma (sagittal rays), and curvature of field, respectively, in the optical system of Embodiment 13.

The objective lens for endoscopes of Embodiment 13 has the front lens unit G1 and the rear lens unit G2 with the aperture stop S between them. In FIG. 25, reference symbol CG denotes the cover glass and IM denotes the image plane. A fundamental arrangement of lens elements in the front lens unit G1 is almost the same as in Embodiment 1. The rear lens unit G2 comprises the third lens element L3" of a plano-convex shape whose object-side surface is flat and whose image-side surface is aspherical and convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

In the objective lens for endoscopes of Embodiment 13, since the values of parameters of Conditions (4) and (4') are small, very high power is required for the third lens element L3" and the aspherical surface is introduced into the third lens element L3". However, the purpose of introducing the aspherical surface is the same as in the objective lens for endoscopes of Embodiment 11 or 12. Also, the objective lens for endoscopes of Embodiment 13 shows an example that the aspherical surface is constructed only by the conic constant k, and in this case, the aspherical surface is always configured as an ellipsoid of $-1<k<0$. In the objective lens for endoscopes of Embodiment 13, the aspherical surface is constructed only by the conic constant k, but even when the conic constant k of this lens element is taken as 0 and only the aspherical coefficients are used, it is possible to correct aberration. In this case, when all the aspherical coefficients are taken as preset values of zero or more, the effect of correction for aberration that is the same as in the objective lens for endoscopes of Embodiment 11 or 12 is obtained.

Subsequently, numerical data of optical members constituting the objective lens for endoscopes of Embodiment 13 are shown below.

for endoscopes of Embodiment 14 according to the present invention. FIGS. 28A, 28B, 28C, and 28D are graphs showing spherical aberration, coma (meridional rays), coma (sagittal rays), and curvature of field, respectively, in the optical system of Embodiment 14.

Figure 27:
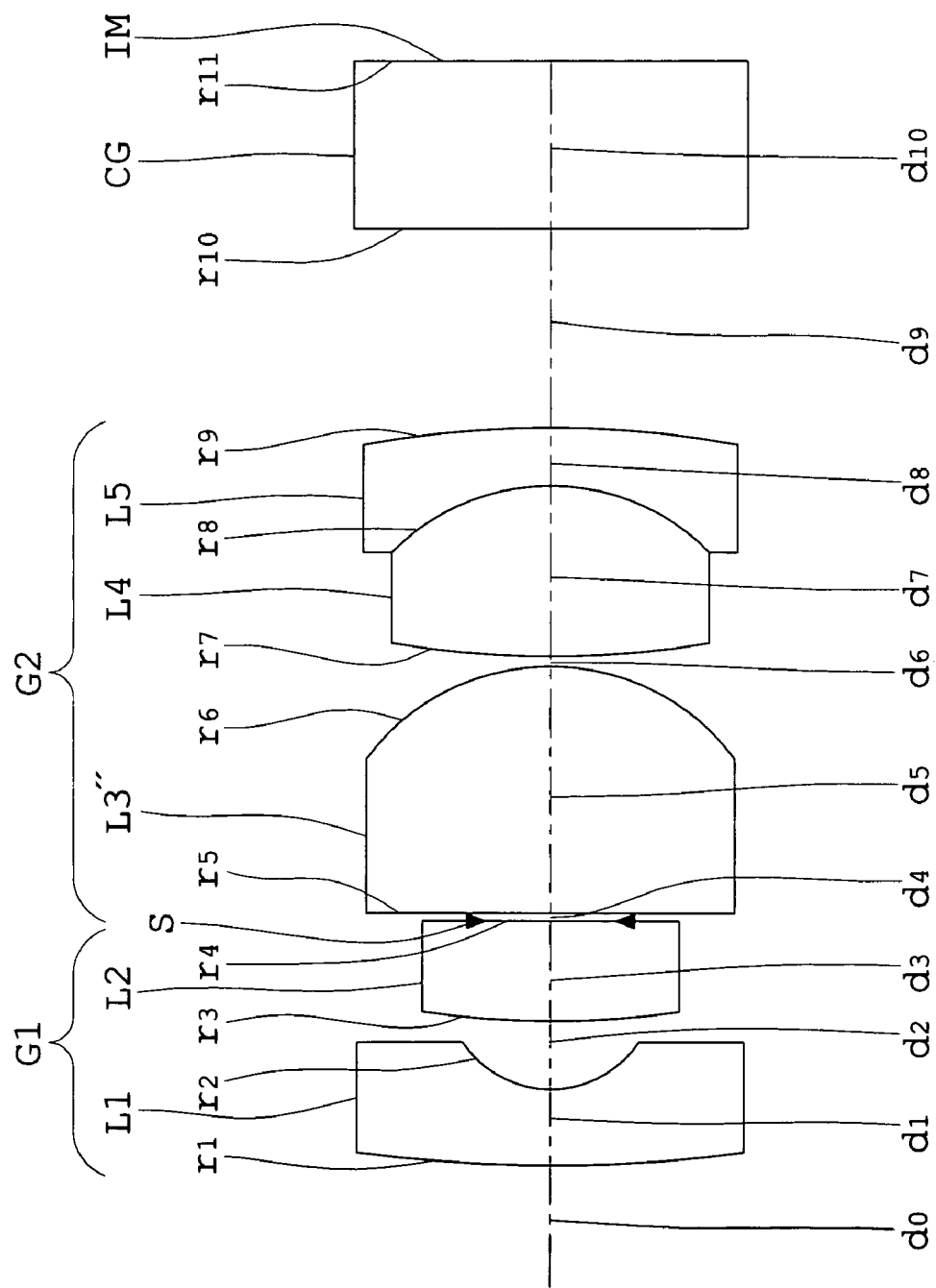
FIG. 27 is a sectional view showing an optical arrangement, developed along the optical axis, of the objective lens for endoscopes of Embodiment 14 according to the pre-sent invention.
Figure 28:
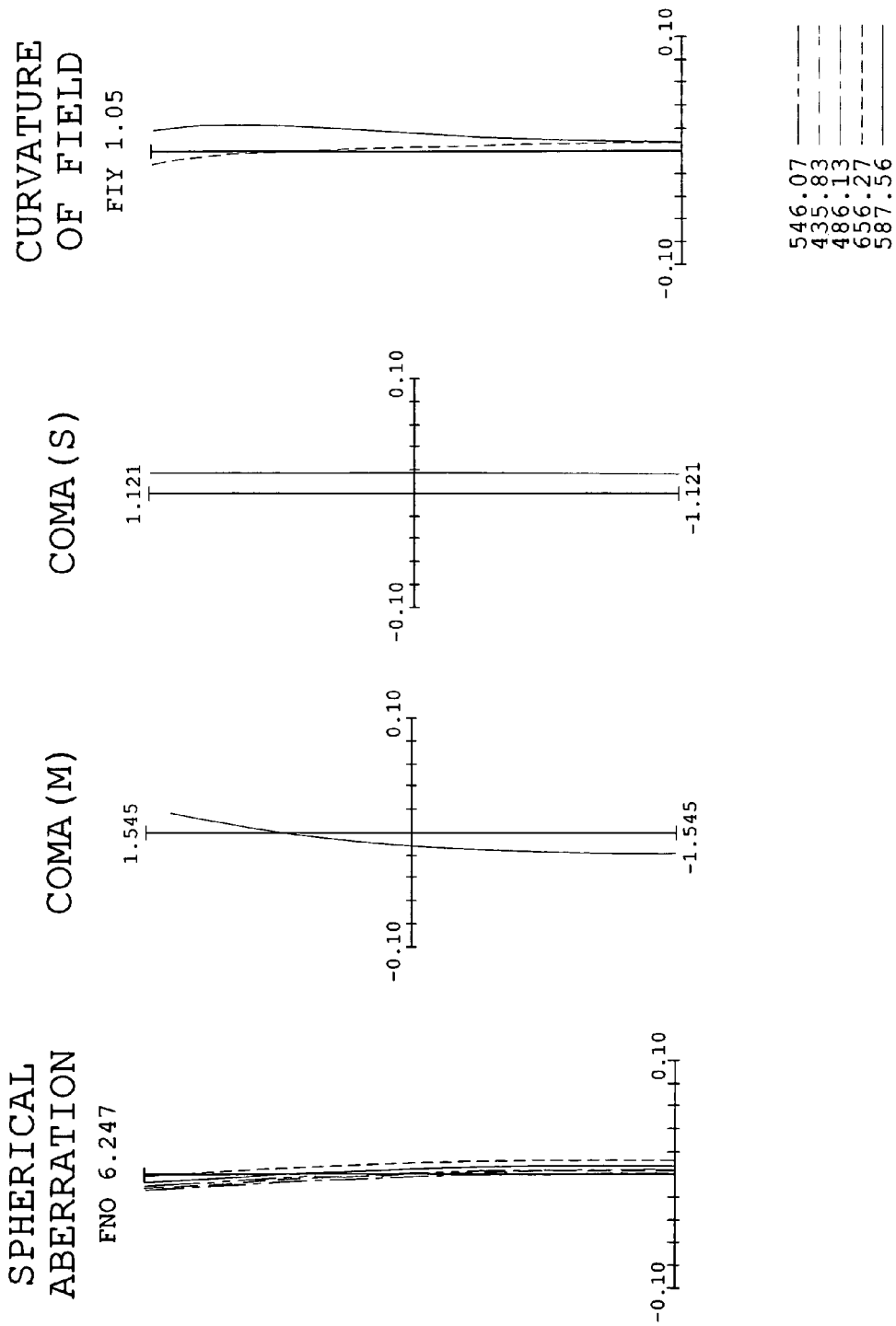
FIGS. 28A, 28B, 28C, and 28D are graphs showing spherical aberration, coma (meridional rays), coma (sagittal rays), and curvature of field, respectively, in the optical system of Embodiment 14.

The objective lens for endoscopes of Embodiment 14 has the front lens unit G1 and the rear lens unit G2 with the aperture stop S between them. In FIG. 27, reference symbol CG denotes the cover glass and IM denotes the image plane. A fundamental arrangement of lens elements in the front lens unit G1 is almost the same as in Embodiment 1. The rear lens unit G2 comprises the third lens element L3" of a plano-convex shape whose object-side surface is flat and whose image-side surface is aspherical and convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented. The purpose of introducing the aspherical surface is as already described, and in the objective lens for endoscopes of Embodiment 14, fourth, sixth, and eighth order aspherical coefficients are used and are zero or more.

Subsequently, numerical data of optical members constituting the objective lens for endoscopes of Embodiment 14 are shown below.

Numerical Embodiment 13
Unit: mm

Surface data

| Face number | Radius of curvature | Face spacing | Refractive index | Abbe's number |
|---|---|---|---|---|
| Object surface | ∞ | 8.7000 | | |
| 1 | 3.7278 | 0.4970 | 1.88815 | 40.76 |
| 2 | 0.7042 | 0.6337 | | |
| 3 | 14.9842 | 0.6213 | 1.81078 | 40.88 |
| 4 (Stop) | ∞ | 0.0124 | | |
| 5 | ∞ | 1.6521 | 1.81078 | 40.88 |
| 6 (Aspherical surface) | −1.4337 | 0.0621 | | |
| 7 | 4.6868 | 1.1432 | 1.73234 | 54.68 |
| 8 | −1.4911 | 0.3728 | 1.93429 | 18.90 |
| 9 | −7.1683 | 0.7400 | | |
| 10 | ∞ | 1.7000 | 1.51825 | 64.14 |
| 11 | ∞ | 0 | | |
| 12 (Image plane) | ∞ | 0 | | |

Aspherical data
Sixth surface k = −0.3600
A2 = 0.0000E+00, A4 = 0.000E+00, A6 = 0.000E+00,
A8 = 0.000E+00, A10 = 0.0000E+00, A12 = 0.0000E+00,
A14 = 0.000E+00, A16 = 0.000E+00, A18 = 0.000E+00,
A20 = 0.0000E+00

Various data

| | |
|---|---|
| Focal length | 1.00000 |
| F number | 6.1311 |
| Angle of view | 136.40448° |
| Image height | 1.153 |
| Overall lens length | 7.4347 |
| Back focus | 1.8672 |

Numerical Embodiment 14
Unit: mm

Surface data

| Face number | Radius of curvature | Face spacing | Refractive index | Abbe's number |
|---|---|---|---|---|
| Object surface | ∞ | 8.0000 | | |
| 1 | 6.8003 | 0.4534 | 1.88815 | 40.76 |
| 2 | 0.6509 | 0.4200 | | |
| 3 | 5.2720 | 0.6053 | 1.93429 | 18.90 |
| 4 (Stop) | ∞ | 0.0322 | | |
| 5 | ∞ | 1.5013 | 1.81078 | 40.88 |
| 6 (Aspherical surface) | −1.3006 | 0.0567 | | |
| 7 | 4.8259 | 1.0427 | 1.73234 | 54.68 |
| 8 | −1.3601 | 0.3400 | 1.93429 | 18.90 |
| 9 | −7.0908 | 1.2114 | | |
| 10 | ∞ | 1.0011 | 1.51825 | 64.14 |
| 11 | ∞ | 0 | | |
| 12 (Image plane) | ∞ | 0 | | |

Aspherical data
Sixth surface k = 0
A2 = 0.000E+00, A4 = 1.9581E−02, A6 = 1.7765E−02,
A8 = 1.4906E−02, A10 = 0.0000E+00, A12 = 0.0000E+00,
A14 = 0.0000E+00, A16 = 0.0000E+00, A18 = 0.0000E+00,
A20 = 0.0000E+00

Various data

| | |
|---|---|
| Focal length | 1.00015 |
| F number | 6.2473 |
| Angle of view | 129.67178° |
| Image height | 1.052 |
| Overall lens length | 6.6641 |
| Back focus | 1.8759 |

Embodiment 14

FIG. 27 is a sectional view showing an optical arrangement, developed along the optical axis, of the objective lens Embodiment 15

Figure 29:
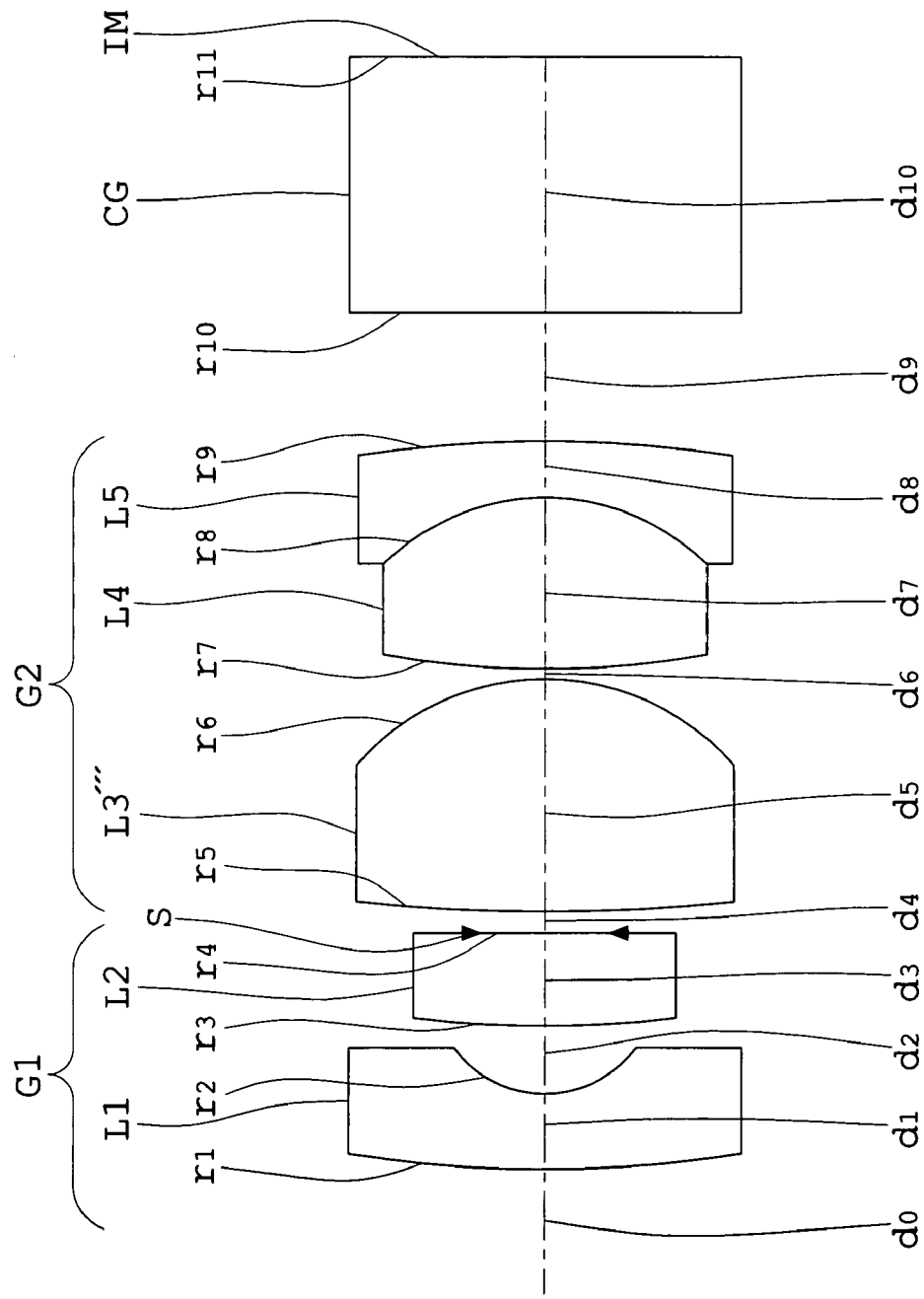
FIG. 29 is a sectional view showing an optical arrangement, developed along the optical axis, of the objective lens for endoscopes of Embodiment 15 according to the pre-sent invention.
Figure 30:
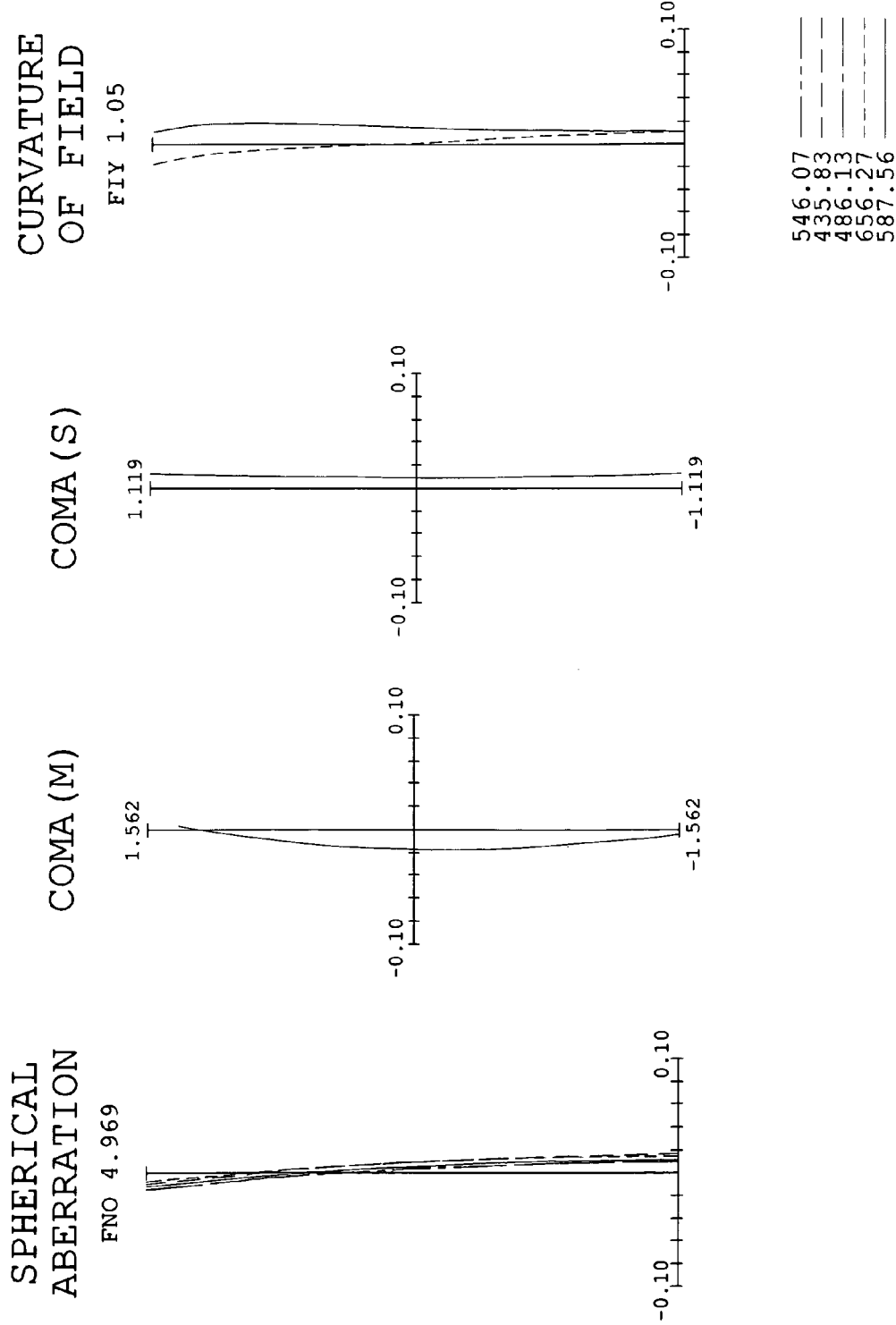
FIGS. 30A, 30B, 30C, and 30D are graphs showing spherical aberration, coma (meridional rays), coma (sagittal rays), and curvature of field, respectively, in the optical system of Embodiment 15.

FIG. 29 is a sectional view showing an optical arrangement, developed along the optical axis, of the objective lens for endoscopes of Embodiment 15 according to the pre-sent invention. FIGS. 30A, 30B, 30C, and 30D are graphs showing spherical aberration, coma (meridional rays), coma (sagittal rays), and curvature of field, respectively, in the optical system of Embodiment 15.

The objective lens for endoscopes of Embodiment 15 has the front lens unit G1 and the rear lens unit G2 with the aperture stop S between them. In FIG. 29, reference symbol CG denotes the cover glass and IM denotes the image plane. A fundamental arrangement of lens elements in the front lens unit G1 is almost the same as in Embodiment 1. The rear lens unit G2 comprises a third lens element L3''' of a biconvex shape whose image-side surface is aspherical, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 15 are shown below.

Numerical Embodiment 15
Unit: mm

Surface data

| Face number | Radius of curvature | Face spacing | Refractive index | Abbe's number |
|---|---|---|---|---|
| Object surface | ∞ | 8.0000 | | |
| 1 | 6.8097 | 0.4540 | 1.88815 | 40.76 |
| 2 | 0.6559 | 0.4210 | | |
| 3 | 5.9889 | 0.5675 | 1.81078 | 40.88 |
| 4 (Stop) | ∞ | 0.1248 | | |
| 5 | 9.0796 | 1.4294 | 1.81078 | 40.88 |
| 6 (Aspherical surface) | −1.33314 | 0.0567 | | |
| 7 | 5.1625 | 1.0441 | 1.73234 | 54.68 |
| 8 | −1.3619 | 0.3405 | 1.93429 | 18.90 |
| 9 | −8.5160 | 0.7870 | | |
| 10 | ∞ | 1.5500 | 1.51825 | 64.14 |
| 11 | ∞ | 0 | | |
| 12 (Image plane) | ∞ | 0 | | |

Aspherical data $k = 0$
$A2 = 0.0000E+00, A4 = 2.3222E-02, A6 = 2.6517E-02,$
$A8 = 7.8886E-03, A10 = 0.0000E+00, A12 = 0.0000E+00,$
$A14 = 0.0000E+00, A16 = 0.0000E+00, A18 = 0.0000E+00,$
$A20 = 0.0000E+00$ Various data

| Focal length | 1.00000 |
|---|---|
| F number | 4.9693 |
| Angle of view | 130.03702° |
| Image height | 1.053 |
| Overall lens length | 6.7751 |
| Back focus | 1.8169 |

Embodiment 16

Figure 31:
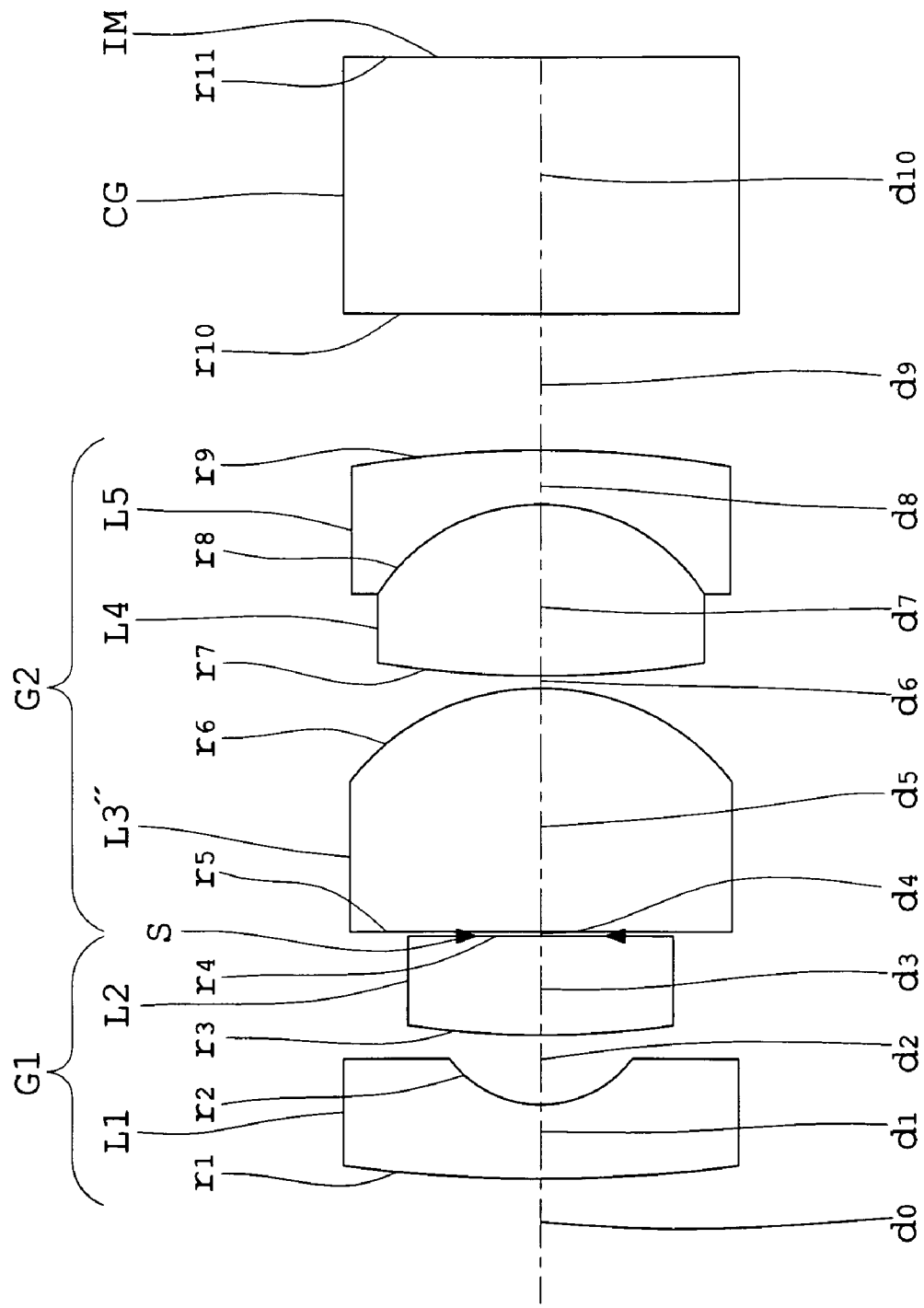
FIG. 31 is a sectional view showing an optical arrangement, developed along the optical axis, of the objective lens for endoscopes of Embodiment 16 according to the pre-sent invention.
Figure 32:
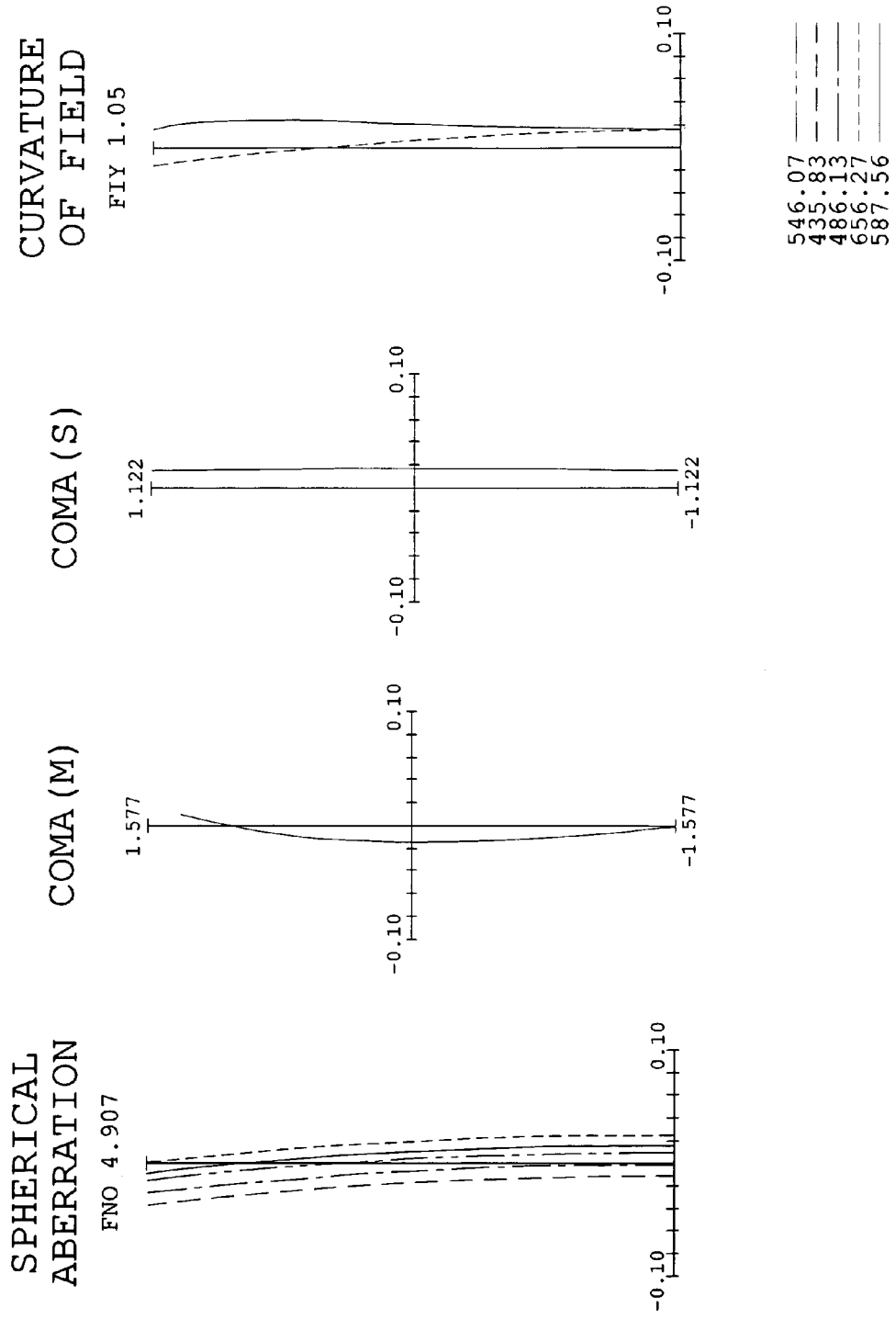
FIGS. 32A, 32B, 32C, and 32D are graphs showing spherical aberration, coma (meridional rays), coma (sagittal rays), and curvature of field, respectively, in the optical system of Embodiment 16.

FIG. 31 is a sectional view showing an optical arrangement, developed along the optical axis, of the objective lens for endoscopes of Embodiment 16 according to the pre-sent invention. FIGS. 32A, 32B, 32C, and 32D are graphs showing spherical aberration, coma (meridional rays), coma (sagittal rays), and curvature of field, respectively, in the optical system of Embodiment 16.

The objective lens for endoscopes of Embodiment 16 has the front lens unit G1 and the rear lens unit G2 with the aperture stop S between them. In FIG. 31, reference symbol CG denotes the cover glass and IM denotes the image plane. A fundamental arrangement of lens elements in the front lens unit G1 is almost the same as in Embodiment 1. The rear lens unit G2 comprises the third lens element L3'' of a plano-convex shape whose object-side surface is flat and whose image-side surface is aspherical and convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 16 are shown below.

Numerical Embodiment 16
Unit: mm

Surface data

| Face number | Radius of curvature | Face spacing | Refractive index | Abbe's number |
|---|---|---|---|---|
| Object surface | ∞ | 8.0000 | | |
| 1 | 6.8112 | 0.4541 | 1.88815 | 40.76 |
| 2 | 0.6541 | 0.4208 | | |
| 3 | 4.9128 | 0.6063 | 1.93429 | 18.90 |
| 4 (Stop) | ∞ | 0.0257 | | |
| 5 | ∞ | 1.4911 | 1.81078 | 40.88 |
| 6 (Aspherical surface) | −1.3125 | 0.0568 | | |
| 7 | 5.2503 | 1.0444 | 1.73234 | 54.68 |
| 8 | −1.1352 | 0.3266 | 1.85504 | 23.78 |
| 9 | −7.2330 | 0.8300 | | |
| 10 | ∞ | 1.5491 | 1.51825 | 64.14 |
| 11 | ∞ | 0 | | |
| 12 (Image plane) | ∞ | 0 | | |

Aspherical data
Sixth surface $k = 0$
$A2 = 0.0000E+00, A4 = 1.6773E-02, A6 = 1.4371E-02,$
$A8 = 1.1602E-2, A10 = 0.0000E+00, A12 = 0.0000E+00,$
$A14 = 0.0000E+00, A16 = 0.0000E+00, A18 = 0.0000E+00,$
$A20 = 0.0000E+00$ Various data

| Focal length | 1.00000 |
|---|---|
| F number | 4.9069 |
| Angle of view | 130.22618° |
| Image height | 1.053 |
| Overall lens length | 6.8048 |
| Back focus | 1.8602 |

Embodiment 17

Figure 33:
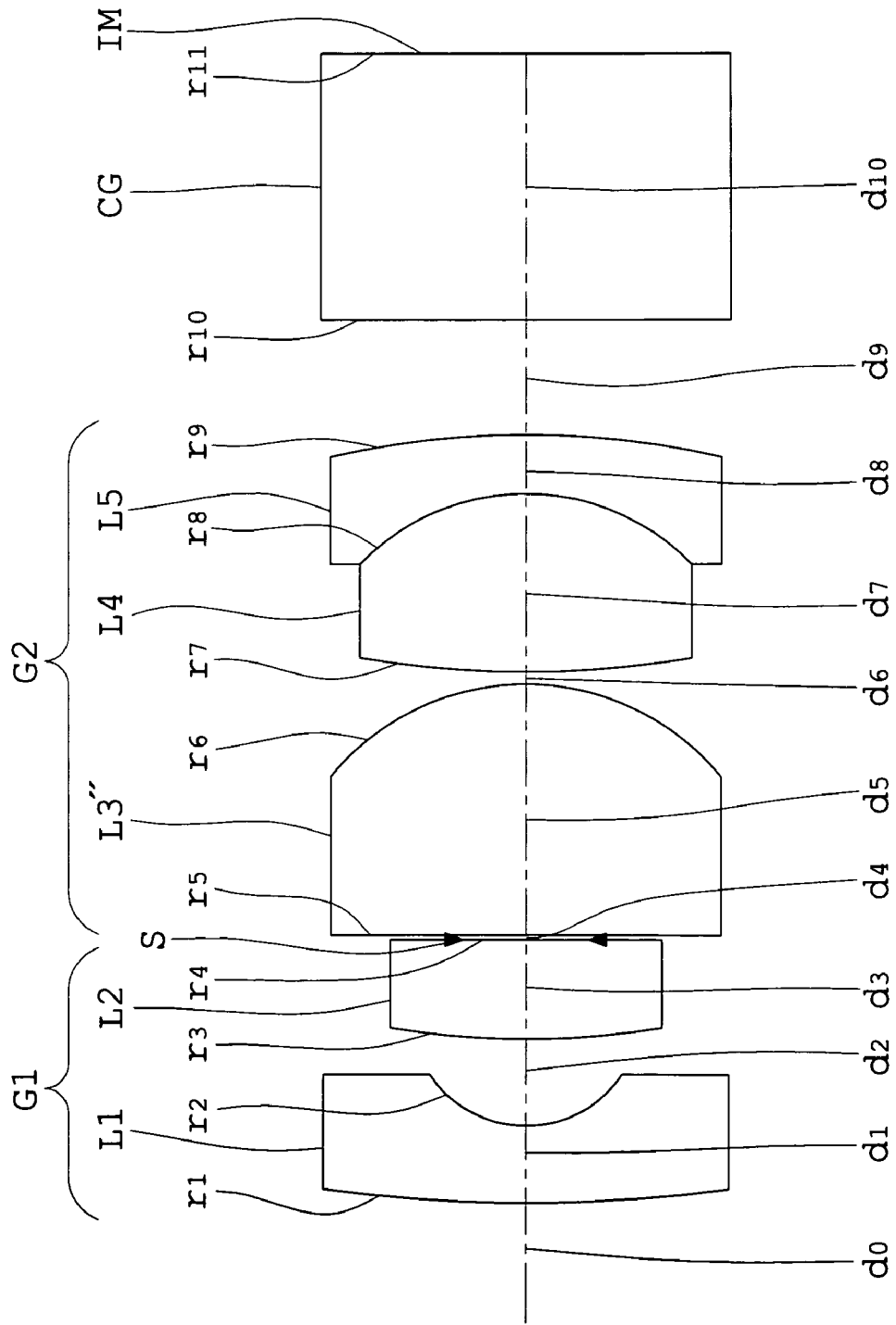
FIG. 33 is a sectional view showing an optical arrangement, developed along the optical axis, of the objective lens for endoscopes of Embodiment 17 according to the pre-sent invention.
Figure 34:
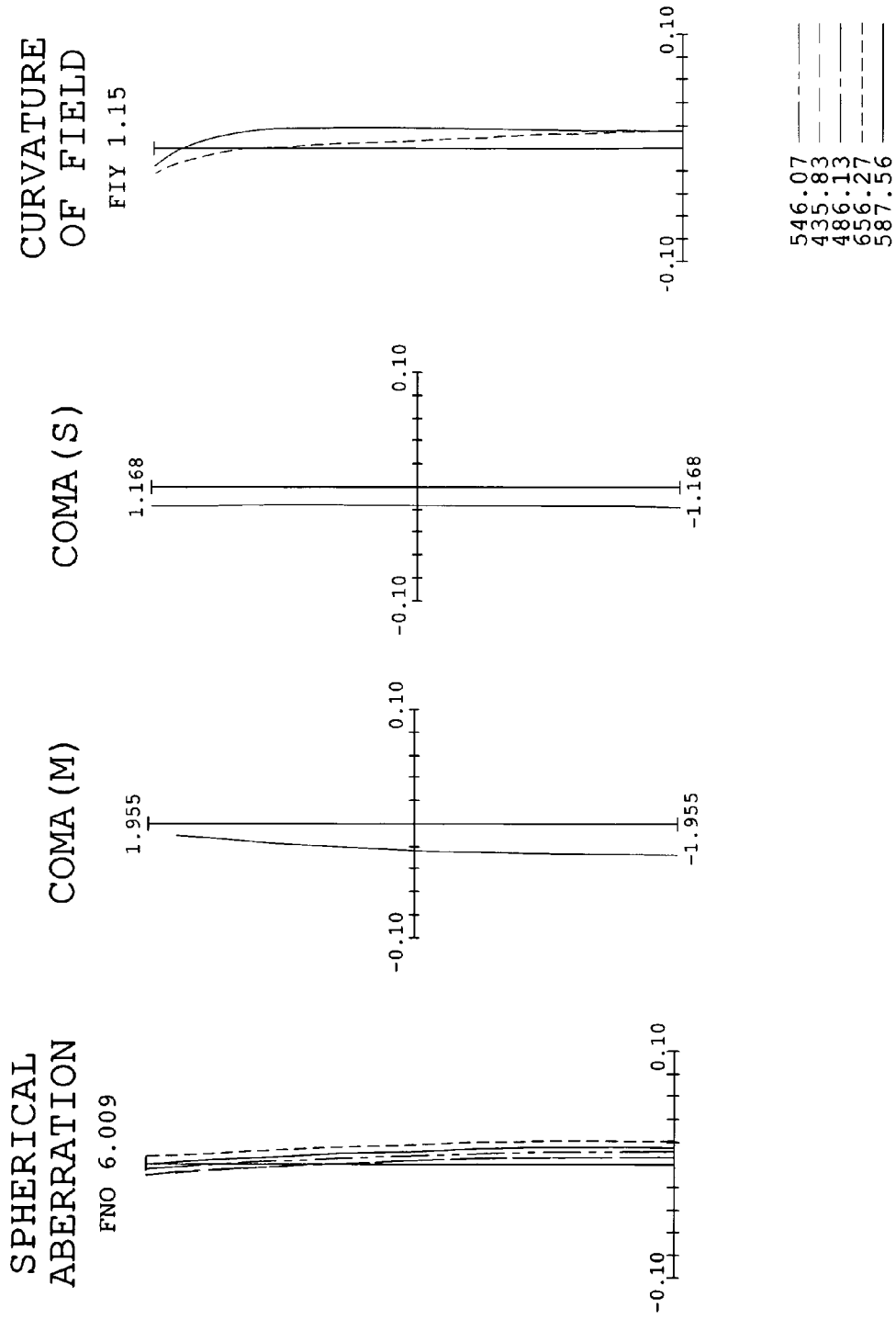
FIGS. 34A, 34B, 34C, and 34D are graphs showing spherical aberration, coma (meridional rays), coma (sagittal rays), and curvature of field, respectively, in the optical system of Embodiment 17.

FIG. 33 is a sectional view showing an optical arrangement, developed along the optical axis, of the objective lens for endoscopes of Embodiment 17 according to the pre-sent invention. FIGS. 34A, 34B, 34C, and 34D are graphs showing spherical aberration, coma (meridional rays), coma (sagittal rays), and curvature of field, respectively, in the optical system of Embodiment 17.

The objective lens for endoscopes of Embodiment 17 has the front lens unit G1 and the rear lens unit G2 with the aperture stop S between them. In FIG. 33, reference symbol CG denotes the cover glass and IM denotes the image plane. A fundamental arrangement of lens elements in the front lens unit G1 is almost the same as in Embodiment 1. The rear lens unit G2 comprises the third lens element L3" of a plano-convex shape whose object-side surface is flat and whose image-side surface is aspherical and convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 17 are shown below.

Numerical Embodiment 17
Unit: mm

Surface data

| Face number | Radius of curvature | Face spacing | Refractive index | Abbe's number |
|---|---|---|---|---|
| Object surface | ∞ | 8.5000 | | |
| 1 | 8.5688 | 0.4896 | 1.88815 | 40.76 |
| 2 | 0.7351 | 0.5413 | | |
| 3 | 5.1986 | 0.6270 | 1.85504 | 23.78 |
| 4 (Stop) | ∞ | 0.0314 | | |
| 5 | ∞ | 1.5836 | 1.81078 | 40.88 |
| 6 (Aspherical surface) | −1.4484 | 0.0612 | | |
| 7 | 4.8629 | 1.1262 | 1.73234 | 54.68 |
| 8 | −1.4689 | 0.3672 | 1.93429 | 18.90 |
| 9 | −6.3545 | 0.7500 | | |
| 10 | ∞ | 1.6500 | 1.51825 | 64.14 |
| 11 | ∞ | 0 | | |
| 12 (Image plane) | ∞ | 0 | | |

Aspherical data
Sixth surface k = 0
A2 = 0.0000E+00, A4 = 1.3449E−02, A6 = 1.6201E−02,
A8 = 2.4472E−03, A10 = 0.0000E+00, A12 = 0.0000E+00,
A14 = 0.0000E+00, A16 = 0.0000E+00, A18 = 0.0000E+00,
A20 = 0.0000E+00

Various data

| Focal length | 1.00001 |
|---|---|
| F number | 6.0087 |
| Angle of view | 153.61802° |
| Image height | 1.150 |
| Overall lens length | 7.2276 |
| Back focus | 1.8482 |

Embodiment 18

Figure 35:
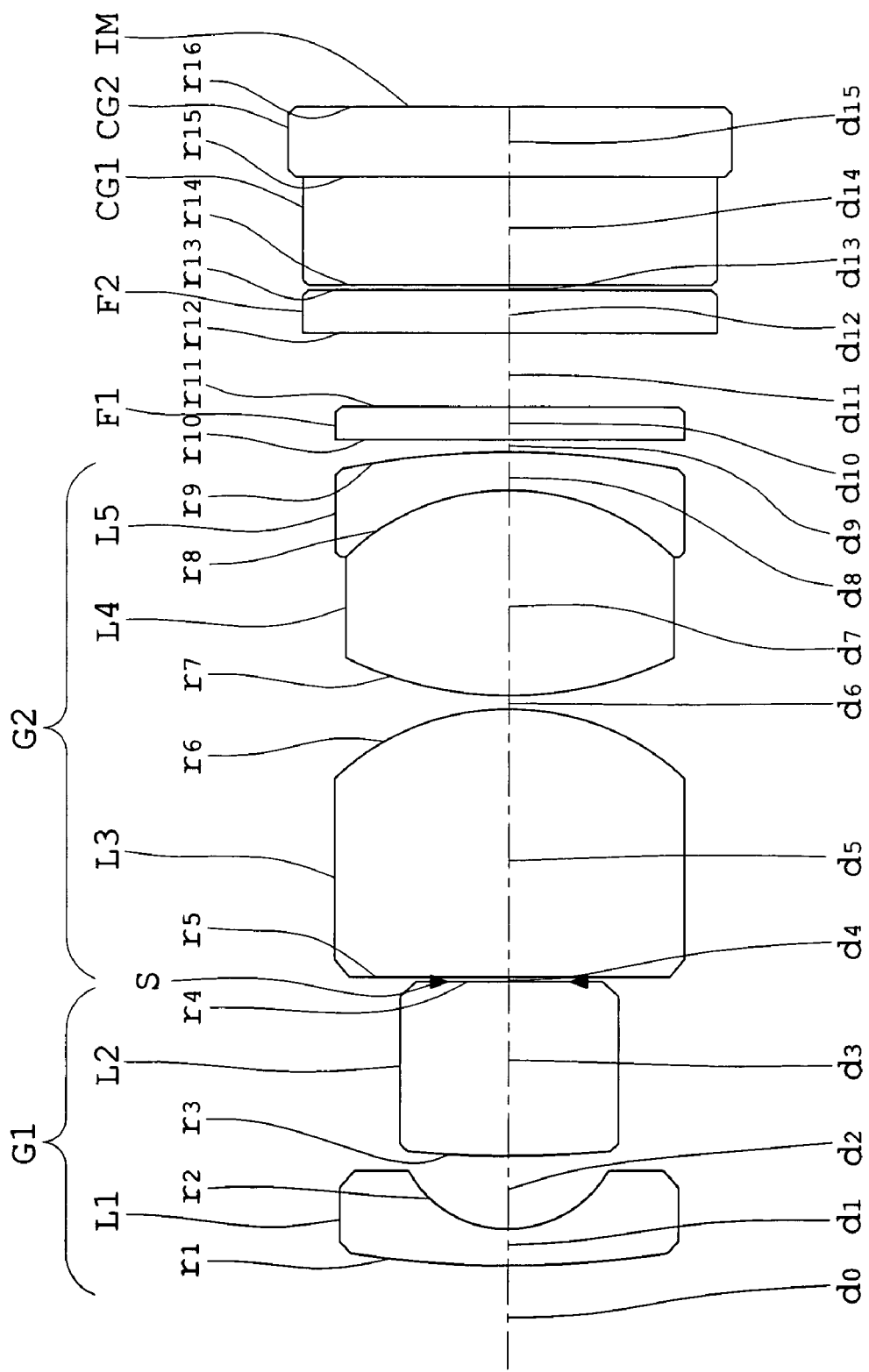
FIG. 35 is a sectional view showing an optical arrangement, developed along the optical axis, of the objective lens for endoscopes of Embodiment 18 according to the pre-sent invention.

FIG. 35 is a sectional view showing an optical arrangement, developed along the optical axis, of the objective lens for endoscopes of Embodiment 18 according to the pre-sent invention. FIGS. 36A, 36B, 36C, and 36D are graphs showing spherical aberration, coma (meridional rays), coma (sagittal rays), and curvature of field, respectively, in the optical system of Embodiment 18.

The objective lens for endoscopes of Embodiment 18 has the front lens unit G1 and the rear lens unit G2 with the aperture stop S between them. In FIG. 35, reference symbols F1 and F2 denote filters, CG1 and CG2 denote cover glasses, and symbol IM denotes the image plane. The front lens unit G1 comprises, in order from the object side, the first lens element L1 with negative refracting power of a meniscus shape, with a convex surface facing the object side and the second lens element L2 of a plano-convex shape whose object-side surface is convex and whose image-side surface is flat. The rear lens unit G2 comprises the third lens element L3 of a plano-convex shape whose object-side surface is flat and whose image-side surface is convex, with a surface of the minor radius of curvature facing the image side, the fourth lens element L4 of a biconvex shape, and the fifth lens element L5 with negative refracting power of a meniscus shape, with a concave surface facing the object side. The fourth lens element L4 and the fifth lens element L5 are cemented.

Subsequently, numerical data of optical members constituting the objective lens for endoscopes of Embodiment 18 are shown below.

Numerical Embodiment 18
Unit: mm

Surface data

| Face number | Radius of curvature | Face spacing | Refractive index | Abbe's number |
|---|---|---|---|---|
| Object surface | ∞ | 10.0763 | | |
| 1 | 6.2316 | 0.2383 | 1.88815 | 40.76 |
| 2 | 0.7298 | 0.4493 | | |
| 3 | 5.8354 | 1.0961 | 1.93429 | 18.90 |
| 4 (Stop) | ∞ | 0.0204 | | |
| 5 | ∞ | 1.7021 | 1.83945 | 42.71 |
| 6 | −1.5523 | 0.0681 | | |
| 7 | 2.3645 | 1.2936 | 1.48915 | 70.23 |
| 8 | −1.4515 | 0.2451 | 1.93429 | 18.90 |
| 9 | −4.6058 | 0.0681 | | |
| 10 | ∞ | 0.2111 | 1.51563 | 75.00 |
| 11 | ∞ | 0.4582 | | |
| 12 | ∞ | 0.2723 | 1.52498 | 59.89 |
| 13 | ∞ | 0.0204 | | |
| 14 | ∞ | 0.6808 | 1.51825 | 64.14 |
| 15 | ∞ | 0.4425 | 1.50792 | 63.00 |
| 16 | ∞ | 0 | | |
| 17 (Image plane) | ∞ | 0 | | |

Various data

| Focal length | 1.00000 |
|---|---|
| F number | 7.8981 |
| Angle of view | 163.36406° |
| Image height | 1.198 |
| Overall lens length | 7.2665 |
| Back focus | 1.6286 |

Also, in Embodiment 18, the filter F1 is an ordinary white plate glass and the filter F2 is the infrared cutoff filter. The YAG laser cutoff coat is applied to the object-side surface of the filter F1 and the multicoat is applied to the image-side surface. The multicoat is applied to each surface of the filter F2.

In the objective lens for endoscopes of the present invention, for example, the single filter F is interposed between the front lens unit G1 and the rear lens unit G2 like Embodiment 1, the single filter F is interposed between the rear lens unit G2 and the cover glass CG like Embodiment 2, or the two filters F1 and F2 are interposed between the rear lens unit G2 and the cover glass CG like Embodiment 18. In this way, when the filter is provided between the front lens unit G1 and the rear lens unit G2 or on the image side of the rear lens unit, the degree of freedom is high in its placement and number.

Subsequently, values of condition parameters in individual embodiments are shown in Table 1.

TABLE 1

| Conditions | (1) SF | (2), (4) $D/(f \times \sin \theta)$ | (3) $(D_1 + D_2 - f_1)/(2 \times f_3)$ |
|---|---|---|---|
| Embodiment 1 | −1.105999 | 1.2478 | 0.947602 |
| Embodiment 2 | −1.233743 | 1.5048 | 0.976628 |
| Embodiment 3 | −1.249915 | 1.6912 | 0.953799 |
| Reference Example 4 | −1.184087 | 1.0078 | 0.907319 |
| Embodiment 5 | −1.184087 | 0.9402 | 0.916556 |
| Embodiment 6 | −1.050795 | 1.2286 | 0.933724 |
| Embodiment 7 | −1.137434 | 1.3723 | 0.912047 |
| Embodiment 8 | −1.198746 | 1.2235 | 1.013374 |
| Embodiment 9 | −1.205065 | 1.2438 | 1.007008 |
| Embodiment 10 | −1.198778 | 1.1034 | 1.001904 |
| Embodiment 11 | −1.192672 | 1.0399 | 0.941757 |
| Embodiment 12 | −1.20079 | 1.1915 | 0.953036 |
| Embodiment 13 | −1.465787 | 1.0520 | 1.05644 |
| Embodiment 14 | −1.211683 | 0.8097 | 0.991025 |
| Embodiment 15 | −1.213164 | 0.8102 | 1.049579 |
| Embodiment 16 | −1.21247 | 0.8094 | 0.98046 |
| Embodiment 17 | −1.18768 | 0.9031 | 0.978703 |
| Embodiment 18 | −1.265314 | 1.0268 | 0.994947 |

What is claimed is:

1. An objective lens for endoscopes having a front lens unit and a rear lens unit with an aperture stop between the front lens unit and the rear lens unit,
the front lens unit comprising, in order from an object side:
a first lens element with negative refracting power of a meniscus shape, with a convex surface facing the object side; and
a second lens element with positive refracting power, and
the rear lens unit comprising:
a third lens element with positive refracting power, with an absolute value of a radius of curvature of an image-side surface being lower than an absolute value of a radius of curvature of an object-side surface;
a fourth lens element with positive refracting power; and
a fifth lens element with negative refracting power,
wherein the fourth lens element and the fifth lens element are cemented and the objective lens satisfies the following conditions:

$-2 < SF < -0.9$ $0.94 < D/(f \times \sin \theta) < 1.7$ $0.93 < (D_1 + D_2 - f_1)/(2 \times f_3) < 1.13$ where SF is a shape factor of the first lens element and is a value expressed by SF=(R2+R1)/(R2−R1) when a radius of curvature of an object-side surface of the first lens element is denoted by R1 and a radius of curvature of an image-side surface of the first lens element is denoted by R2; D is an equivalent air length along an optical axis from a vertex of the image-side surface of the first lens element to the aperture stop; f is a combined focal length of an entire system; θ is a half angle of view; $D_1$ is an actually measured distance along the optical axis from a vertex of the object-side surface of the first lens element to the aperture stop; $D_2$ is an equivalent air length along the optical axis from the aperture stop to a vertex of the image-side surface of the third lens element; $f_1$ is a focal length of the first lens element; and $f_3$ is a focal length of the third lens element.

2. An objective lens for endoscopes according to claim 1, satisfying the following condition:

$-1.5 < SF < -1.0$.

3. An objective lens for endoscopes according to claim 1, satisfying the following condition:

$0.93 < (D_1 + D_2 - f_1)/(2 \times f_3) < 1.06$.

4. An objective lens for endoscopes according to claim 1, wherein the third lens element is a lens element with positive refracting power, with a surface facing an image side configured as an aspherical surface whose curvature moderates in going from a center to a periphery.

5. An objective lens for endoscopes having a front lens unit and a rear lens unit with an aperture stop between the front lens unit and the rear lens unit,
the front lens unit comprising, in order from an object side:
a first lens element with negative refracting power of a meniscus shape, with a convex surface facing the object side; and
a second lens element with positive refracting power, and
the rear lens unit comprising:
a third lens element with positive refracting power, with a surface facing an image side configured as an aspherical surface whose curvature moderates in going from a center to a periphery;
a fourth lens element with positive refracting power; and
a fifth lens element with negative refracting power,
wherein the fourth lens element and the fifth lens element are cemented and the objective lens satisfies the following conditions:

$-2 < SF < -0.9$ $0.65 < D/(f \times \sin \theta) \leq 0.94$ $0.86 < (D_1 + D_2 - f_1)/(2 \times f_3) < 1.13$ where SF is a shape factor of the first lens element and is a value expressed by SF=(R2+R1)/(R2−R1) when a radius of curvature of an object-side surface of the first lens element is denoted by R1 and a radius of curvature of an image-side surface of the first lens element is denoted by R2; D is an equivalent air length along an optical axis from a vertex of the image-side surface of the first lens element to the aperture stop; f is a combined focal length of an entire system; θ is a half angle of view; $D_1$ is an actually measured distance along the optical axis from a vertex of the object-side surface of the first lens element to the aperture stop; $D_2$ is an equivalent air length along the optical axis from the aperture stop to a vertex of the image-side surface of the third lens element; $f_1$ is a focal length of the first lens element; and $f_3$ is a focal length of the third lens element.

6. An objective lens for endoscopes according to claim 5, satisfying the following condition:

$-1.5 < SF < -1.0$.

7. An objective lens for endoscopes according to claim 5, satisfying the following condition:

$0.90 < (D_1 + D_2 - f_1)/(2 \times f_3) < 1.06$.

8. An objective lens for endoscopes according to claim 5, satisfying the following condition:

$0.8 < D/(f \times \sin \theta) \leq 0.94$.

* * * * *